United States Patent
Yoshida

(10) Patent No.: US 12,224,804 B2
(45) Date of Patent: Feb. 11, 2025

(54) TRANSMISSION CODE PROCESSING DEVICE, TRANSMISSION CODE PROCESSING METHOD, AND OPTICAL TRANSMITTER

(71) Applicant: Mitsubishi Electric Corporation, Tokyo (JP)

(72) Inventor: Tsuyoshi Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 240 days.

(21) Appl. No.: 18/168,250

(22) Filed: Feb. 13, 2023

(65) Prior Publication Data

US 2023/0208526 A1    Jun. 29, 2023

Related U.S. Application Data

(63) Continuation of application No. PCT/JP2020/039634, filed on Oct. 21, 2020.

(51) Int. Cl.
*H04B 10/516* (2013.01)
(52) U.S. Cl.
CPC .................. *H04B 10/516* (2013.01)
(58) Field of Classification Search
CPC .................................... H04B 10/516
See application file for complete search history.

(56) References Cited

U.S. PATENT DOCUMENTS

| | | | | |
|---|---|---|---|---|
| 10,091,046 B1 * | 10/2018 | Lefevre | .................. | H04L 27/36 |
| 10,749,554 B1 * | 8/2020 | Millar | ...................... | H04B 1/10 |

(Continued)

FOREIGN PATENT DOCUMENTS

| | | |
|---|---|---|
| JP | 2007-306469 A | 11/2007 |
| JP | WO2018/167920 A1 | 9/2018 |

(Continued)

OTHER PUBLICATIONS

Extended European Search Report for European Application No. 20958689.0, dated Oct. 9, 2023.

(Continued)

*Primary Examiner* — Shi K Li
(74) *Attorney, Agent, or Firm* — Birch, Stewart, Kolasch & Birch, LLP

(57) ABSTRACT

A transmission code processing device includes: a signal point arrangement shaping encoding unit to perform conversion into a shaped bit of mi column; a systematic error correction encoding unit to generate a parity bit of mp column based on the shaped bit; a first symbol mapping unit to convert the shaped bit into a first modulation symbol; a second symbol mapping unit to convert the parity bit into a second modulation symbol; and a symbol multiplexing unit to multiplex the first and second modulation symbols, in which the first modulation symbol has one element in a first signal point set including ci signal point including an origin, the second modulation symbol has one element in cp signal point not including the origin, and the signal point arrangement shaping encoding unit performs signal point arrangement shaping in which the first modulation symbol has one element in the first signal point set.

8 Claims, 17 Drawing Sheets

(56) References Cited

U.S. PATENT DOCUMENTS

| | | | |
|---|---|---|---|
| 2016/0087649 A1* | 3/2016 | Limberg | H03M 13/356 714/776 |
| 2020/0119840 A1 | 4/2020 | Ebrahimzad et al. | |
| 2020/0287756 A1 | 9/2020 | Razzetti et al. | |
| 2021/0135778 A1 | 5/2021 | Yoshida | |
| 2021/0203363 A1 | 7/2021 | Okamoto et al. | |
| 2021/0281450 A1 | 9/2021 | Binkai et al. | |
| 2021/0336733 A1 | 10/2021 | Yoshida | |
| 2023/0006769 A1 | 1/2023 | Yoshida | |

FOREIGN PATENT DOCUMENTS

| | | |
|---|---|---|
| JP | 2019-205067 A | 11/2019 |
| JP | WO2020/031257 A1 | 2/2020 |
| JP | WO2020/174574 A1 | 9/2020 |
| WO | 2021/166203 A1 | 8/2021 |

OTHER PUBLICATIONS

Ahmed Elzanaty et al., "Adaptive Coded Modulation for IM/DD Free-Space Optical Backhauling: A Probabilistic Shaping Approach", IEEE Transactions on Communications, DOI: 10.1109/TCOMM. 2020.3006575, pp. 1-15, Jul. 2020.

Georg Bocherer et al., "Bandwidth Efficient and Rate-Matched Low-Density Parity-Check Coded Modulation", IEEE Transactions on Communications, vol. 63, No. 12, pp. 4651-4665, Dec. 2015.

International Search Report (PCT/ISA/210) issued in PCT/JP2020/ 039634, dated Jan. 12, 2021.

Tsuyoshi Yoshida et al., "Hierarchical Distribution Matching for Probabilistically Shaped Coded Modulation", Journal of Lightwave Technology, vol. 37, No. 6, pp. 1579-1589, Mar. 15, 2019.

Written Opinion of the International Searching Authority(PCT/ISA/ 237) issued in PCT/JP2020/039634, dated Jan. 12, 2021.

\* cited by examiner (Gray Encoding PAM)

FIG. 14A

| Information Symbol (PAM) XI | One-Dimensional Shaped Bit BSP1 [1:mi] |
|---|---|
| 15 | 0101 |
| 13 | 0100 |
| 11 | 0111 |
| 9 | 0110 |
| 7 | 0011 |
| 5 | 0010 |
| 3 | 0001 |
| 1 | 0000 |
| -1 | 1001 |
| -3 | 1000 |
| -5 | 1011 |
| -7 | 1010 |
| -9 | 1111 |
| -11 | 1110 |
| -13 | 1101 |
| -15 | 1100 |

FIG. 14B

| Information Symbol (PAM) XI | One-Dimensional Shaped Bit BSP1 [1:mi] |
|---|---|
| 14 | 0101 |
| 12 | 0100 |
| 10 | 0111 |
| 8 | 0110 |
| 6 | 0011 |
| 4 | 0010 |
| 2 | 0001 |
| 0 | 0000 |
| -2 | 1001 |
| -4 | 1000 |
| -6 | 1011 |
| -7 | 1010 |
| -10 | 1111 |
| -12 | 1110 |
| -14 | 1101 |

TRANSMISSION CODE PROCESSING DEVICE, TRANSMISSION CODE PROCESSING METHOD, AND OPTICAL TRANSMITTER

CROSS REFERENCE TO RELATED APPLICATIONS

This application is a Continuation of PCT International Application No. PCT/JP2020/039634, filed on Oct. 21, 2020, all of which is hereby expressly incorporated by reference into the present application.

TECHNICAL FIELD

The present disclosure relates to a transmission code processing device, a transmission code processing method, and an optical transmitter.

BACKGROUND ART

In an optical communication system that transmits a communication target bit string by using an optical fiber, error correction or signal point arrangement shaping may be performed on the communication target bit string in order to efficiently increase a rate of information to be transmitted.

Examples of practical error correction in the optical communication system include: bit interleave encoding modulation in which whole signals are substantially uniformly protected by a single code; and multi-level encoding and multi-stage decoding in which decoding is sequentially performed from a lower bit, by combining different codes while paying attention to the performance difference between a higher bit and a lower bit which constitute a multivalued modulation symbol.

For example, Non-Patent Literature 1 discloses a communication method for generating a transmission signal by a transmission code processing method in which the bit interleave encoding modulation, multivalued modulation for generating a modulation symbol having a plurality of bit levels, and probability distribution shaping are combined, and transmitting the generated transmission signal to a device on a reception side. Specifically, in the transmission code processing method (hereinafter, referred to as "conventional transmission code processing method") disclosed in Non-Patent Literature 1, for a modulation symbol having an amplitude of not zero, an absolute value of the amplitude of the modulation symbol is probabilistically shaped using an outer code, and systematic error correction is further performed by an inner code.

CITATION LIST

Non-Patent Literatures

Non-Patent Literature 1: G. Boecherer[*1] et al, "Bandwidth Efficient and Rate-Matched Low-Density Parity-Check Coded Modulation", IEEE Transactions on Communications, vol. 63, no. 12, pp. 4651-4665 Dec. 2015. (*1 "oe" in "Boecherer" is notation of umlaut "o" as "oe")

SUMMARY OF INVENTION

Technical Problem

In general, since an error correction parity bit cannot be probabilistically shaped, the error correction parity bit is allocated to a bit that determines positive and negative polarities of a modulation symbol. The conventional transmission code processing method can facilitate decoding processing in a device on a reception side, by performing probability distribution shaping by using an outer code. Furthermore, the conventional transmission code processing method can improve theoretical performance of communication in an additive white Gaussian noise environment under average power constraint, by increasing the probability of a transmission signal having an amplitude value near the origin among transmission signals by probability distribution shaping, as compared with a method in a case in which uniformly distributed transmission signals are transmitted and received. Therefore, an optical communication system adopting the conventional transmission code processing method can increase an information rate at the time of amplification transmission of multistage light, or improve performance at the time of amplification transmission of multistage light, as compared with a method in the case in which uniformly distributed transmission signals are transmitted and received.

Since a transmitter that generates a transmission signal by the conventional transmission code processing method, however, needs a modulation symbol having an amplitude value of not zero even when transmitting a signal at a low information rate, the transmitter needs to use, for example, 16 quadrature amplitude modulation (hereinafter, referred to as "16 QAM") as the arrangement of signal points in two-dimensional coordinate space for the transmission signal.

Examples of an information rate sufficiently lower than 16 QAM include four phase modulation (hereinafter, referred to as "quadrature phase shift keying (QPSK)"). The conventional transmission code processing method, however, has a problem that, when the probability distribution of the arrangement of signal points of 16 QAM is controlled to achieve an information rate near the QPSK, a peak to average power ratio (hereinafter, referred to as "PAPR") of a signal is remarkably increased, and as a result, theoretical performance is remarkably degraded depending on nonlinearity of an analog component, finite arithmetic bit accuracy of a digital circuit, or the like.

The present disclosure is made to solve the problem, and an object thereof is to provide a transmission code processing device capable of generating a transmission signal with high theoretical performance without using a high QAM when transmitting a communication target bit string at a low information rate.

Solution to Problem

A transmission code processing device according to the present disclosure includes: signal point arrangement shaping encoding circuitry to perform signal point arrangement shaping encoding on a communication target bit input from an outside, and convert the communication target bit into a shaped bit of mi (mi is an integer equal to or more than one) column; systematic error correction encoding circuitry to perform systematic error correction encoding by using, as an information bit, the shaped bit obtained by conversion performed by the signal point arrangement shaping encoding circuitry, and generate a parity bit of mp (mp is an integer equal to or more than one) column based on the shaped bit; first symbol mapping circuitry to convert the shaped bit obtained by conversion performed by the signal point arrangement shaping encoding circuitry into a first modulation symbol; second symbol mapping circuitry to convert the parity bit generated by the systematic error correction encoding circuitry into a second modulation symbol; and symbol multiplexing circuitry to generate a third modulation symbol by multiplexing the first modulation symbol obtained by conversion performed by the first symbol mapping circuitry and the second modulation symbol obtained by conversion performed by the second symbol mapping circuitry, in which the first modulation symbol has one signal point element in a first signal point set including ci (ci is an integer equal to or more than one) signal point including an origin, the second modulation symbol has one signal point element in a second signal point set including cp (cp is an integer equal to or more than one) signal point not including the origin, and the signal point arrangement shaping encoding circuitry performs signal point arrangement shaping in which the first modulation symbol has one signal point element included in the first signal point set.

Advantageous Effects of Invention

According to the present disclosure, a transmission signal with high theoretical performance can be generated without using a high QAM when a communication target bit string at a low information rate is transmitted.

BRIEF DESCRIPTION OF DRAWINGS

FIGS. 14A and 14B are explanatory diagrams illustrating examples of a symbol mapping rule used by a first symbol mapping unit of the transmission code processing device according to the second embodiment.

DESCRIPTION OF EMBODIMENTS

In order to describe the present disclosure in more detail, embodiments for carrying out the present disclosure will be described below with reference to the accompanying drawings.

First Embodiment

A transmission code processing device 100 according to a first embodiment and an optical transmitter 1 in which the transmission code processing device 100 is used will be described with reference to FIGS. 1 to 9.

A configuration of a main part of the optical transmitter 1 according to the first embodiment will be described with reference to FIG. 1.

Figure 1:
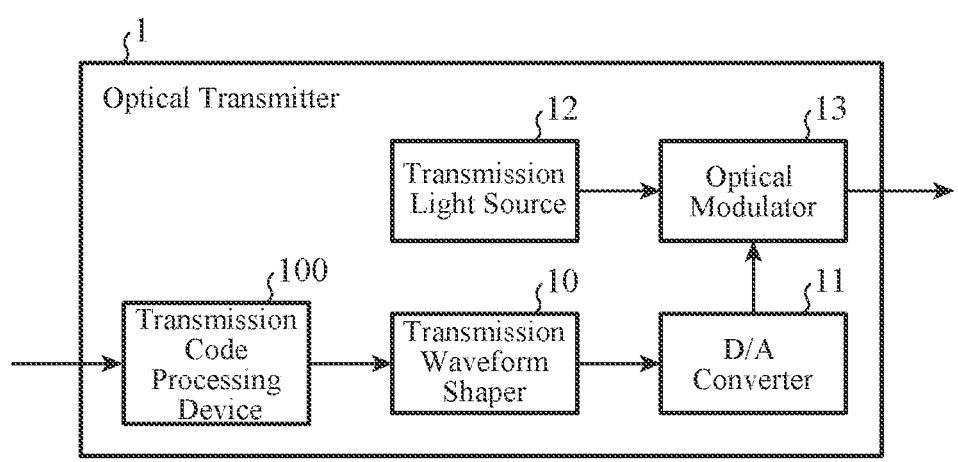
FIG. 1 is a configuration diagram illustrating one example of a configuration of a main part of an optical transmitter according to a first embodiment.

FIG. 1 is a configuration diagram illustrating one example of the configuration of the main part of the optical transmitter 1 according to the first embodiment.

The optical transmitter 1 includes the transmission code processing device 100, a transmission waveform shaper 10, a D/A converter 11, a transmission light source 12, and an optical modulator 13.

The transmission code processing device 100 acquires a communication target bit input from the outside, and on the basis of the acquired communication target bit, generates a modulation symbol (hereinafter, referred to as "modulation symbol X") which is a pulse amplitude modulation (PAM) symbol. The transmission code processing device 100 outputs the generated modulation symbol X to the transmission waveform shaper 10.

Details of the transmission code processing device 100 will be described later.

The transmission waveform shaper 10 generate a digital baseband signal, by receiving the modulation symbol X output from the transmission code processing device 100 and converting the modulation symbol X into the digital baseband signal. The transmission waveform shaper 10 outputs the generated digital baseband signal to the D/A converter 11.

Specifically, for example, the transmission waveform shaper 10 generates a quadrature amplitude modulation (QAM) symbol, by using two modulation symbols X which are PAM symbols output from the transmission code processing device 100. The transmission waveform shaper 10 generates a digital baseband signal by performing waveform equalization on the generated QAM symbol, and outputs the generated digital baseband signal to the outside. After performing the waveform equalization on the QAM symbol, the transmission waveform shaper 10 may generate the digital baseband signal by multiplexing a plurality of subcarriers when subcarrier multiplexing is performed. Note that a method of generating a QAM symbol by using two PAM symbols, and a method of generating a digital baseband signal on the basis of a QAM symbol are known, and thus detailed description thereof will be omitted.

The D/A converter 11 receives a digital baseband modulation signal output from the transmission waveform shaper 10, converts the digital baseband modulation signal into an analog electrical signal which is an analog baseband modulation signal, and outputs the analog electrical signal after conversion to the optical modulator 13. The D/A converter 11 may convert the digital baseband modulation signal into the analog baseband modulation signal while electrically amplifying the analog baseband modulation signal, and output the amplified analog baseband modulation signal, as an analog electrical signal, to the optical modulator 13.

The transmission light source 12 outputs unmodulated light. The transmission light source 12 generates, for example, unmodulated light having a center wavelength of 1550 nanometers (hereinafter, referred to as "nm"), and outputs the generated unmodulated light to the optical modulator 13. The transmission light source 12 includes a wavelength variable light source of an external resonator type.

The optical modulator 13 receives the analog electrical signal output from the D/A converter 11 and the unmodulated light output from the transmission light source 12, generates modulated light by modulating the unmodulated light on the basis of the analog electrical signal, and outputs the generated modulated light, as a modulated light signal, to an optical transmission path (not illustrated). The optical modulator 13 includes a polarization multiplexing quadrature phase modulator.

A configuration of a main part of the transmission code processing device 100 according to the first embodiment will be described with reference to FIG. 2.

Figure 2:
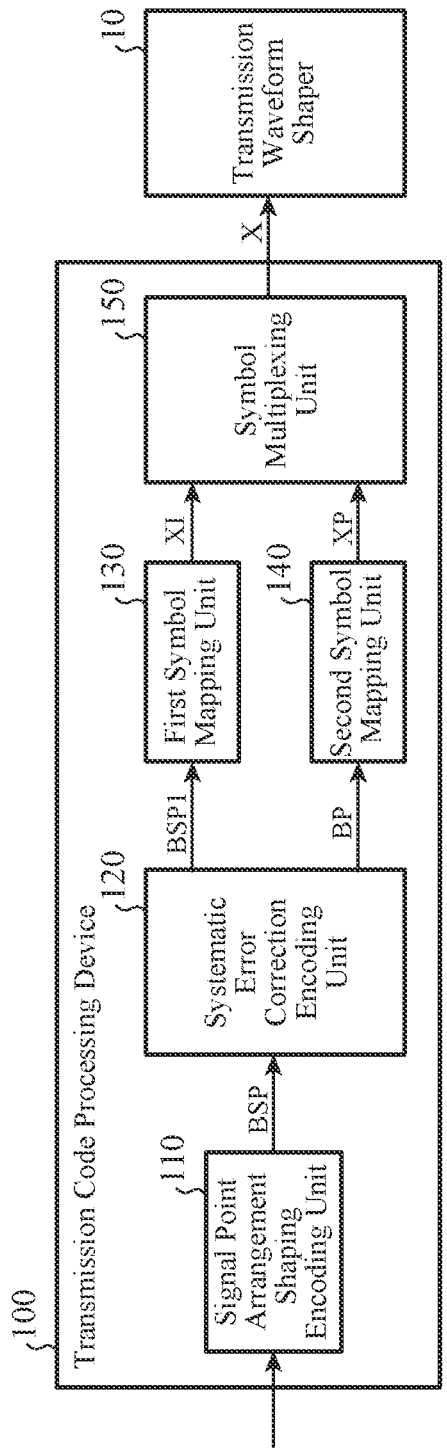
FIG. 2 is a configuration diagram illustrating one example of a configuration of a main part of a transmission code processing device according to the first embodiment.

FIG. 2 is a configuration diagram illustrating one example of the configuration of the main part of the transmission code processing device 100 according to the first embodiment.

The transmission code processing device 100 includes a signal point arrangement shaping encoding unit 110, a systematic error correction encoding unit 120, a first symbol mapping unit 130, a second symbol mapping unit 140, and a symbol multiplexing unit 150.

Note that, in addition to the configuration, the transmission code processing device 100 may include a transmission waveform processing unit (not illustrated in FIG. 2) including the transmission waveform shaper 10, or may include: a transmission waveform processing unit (not illustrated in FIG. 2) including the transmission waveform shaper 10; and a D/A conversion unit (not illustrated in FIG. 2) including the D/A converter 11. When the transmission code processing device 100 includes the transmission waveform processing unit in addition to the configuration, the optical transmitter 1 does not need to include the transmission waveform shaper 10, and when the transmission code processing device 100 includes the transmission waveform processing unit and the D/A conversion unit in addition to the configuration, the optical transmitter 1 does not need to include the transmission waveform shaper 10 and the D/A converter 11.

Hereinafter, description will be given on the assumption that the transmission code processing device 100 includes neither the transmission waveform processing unit nor the D/A conversion unit.

The signal point arrangement shaping encoding unit 110 acquires a communication target bit input from the outside. The signal point arrangement shaping encoding unit 110 performs signal point arrangement shaping encoding on the acquired communication target bit, and converts the communication target bit into a shaped bit (hereinafter, referred to as "shaped bit BSP") of mi (mi is an integer equal to or more than one) columns.

The systematic error correction encoding unit 120 performs systematic error correction encoding by using, as an information bit, the shaped bit BSP obtained by the conversion performed by the signal point arrangement shaping encoding unit 110, and generates a parity bit (hereinafter, referred to as "parity bit BP") of mp (mp is an integer equal to or more than one) columns based on the shaped bit BSP.

The first symbol mapping unit 130 converts the shaped bit BSP obtained by the conversion performed by the signal point arrangement shaping encoding unit 110 into a first modulation symbol (hereinafter, referred to as "information symbol XI").

The second symbol mapping unit 140 converts the parity bit BP generated by the systematic error correction encoding unit 120 into a second modulation symbol (hereinafter, referred to as "parity symbol XP").

The information symbol XI, which is the first modulation symbol obtained by the conversion performed by the first symbol mapping unit 130, includes any one of signal point elements in a signal point set (hereinafter, referred to as "first signal point set sci") including ci (ci is an integer equal to or more than one) signal points including an origin.

Furthermore, the parity symbol XP, which is the second modulation symbol obtained by the conversion performed by the second symbol mapping unit 140, includes any one of signal point elements in a signal point set (hereinafter, referred to as "second signal point set scp") including cp (cp is an integer equal to or more than one) signal points not including the origin.

The signal point arrangement shaping encoding unit 110 performs signal point arrangement shaping in such a way that the information symbol XI, which is the first modulation symbol, includes any one of the signal point elements in the first signal point set sci.

The symbol multiplexing unit 150 generates a third modulation symbol which is the modulation symbol X, by multiplexing the information symbol XI, which is the first modulation symbol obtained by the conversion performed by the first symbol mapping unit 130, and the parity symbol XP, which is the second modulation symbol obtained by the conversion performed by the second symbol mapping unit 140. The symbol multiplexing unit 150 outputs the generated modulation symbol X, which is the third modulation symbol, to the transmission waveform shaper 10 of the optical transmitter 1.

Note that a method of performing conversion into a different modulation symbol by using both an information symbol, which is a modulation symbol including only a shaped bit obtained by applying probabilistic shaping encoding to a communication target bit input from the outside, and a parity symbol, which is a modulation symbol obtained by converting a parity bit of an error correction code for protecting the shaped bit, and of transmitting the modulation symbol, is disclosed, for example, by A. Elzanaty et. al in "Adaptive Coded Modulation for IM/DD Free-Space Optical Backhauling: A Probabilistic Shaping Approach", IEEE Transactions on Communications, DOI: 10.1109/TCOMM.2020.3006575, July 2020.

A data format of the modulation symbol X, which is the third modulation symbol generated by the symbol multiplexing unit 150 of the transmission code processing device 100 according to the first embodiment, will be described with reference to FIG. 3.

Figure 3:
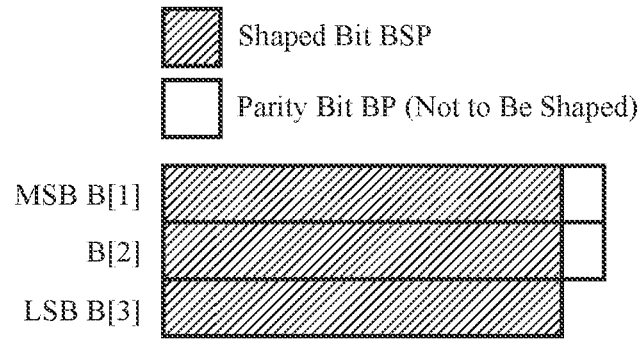
FIG. 3 is an explanatory diagram illustrating one example of a data format of a third modulation symbol generated by a symbol multiplexing unit of the transmission code processing device according to the first embodiment.

FIG. 3 is an explanatory diagram illustrating one example of the data format of the modulation symbol X, which is the third modulation symbol generated by the symbol multiplexing unit 150 of the transmission code processing device 100 according to the first embodiment.

FIG. 3 illustrates a data format of the modulation symbol X in a case of mi=3 and mp=2.

In the first embodiment, description will be given on the assumption that both the first symbol mapping unit 130 and the second symbol mapping unit 140 perform one-dimensional modulation. The modulation performed by the first symbol mapping unit 130 and the second symbol mapping unit 140 are not limited to the one-dimensional modulation, and may be multidimensional modulation.

When the first symbol mapping unit 130 performs the one-dimensional modulation, for example, the information symbol XI generated by the first symbol mapping unit 130 from the shaped bit BSP is a pulse amplitude modulation (PAM) symbol of up to eight values. Furthermore, when the second symbol mapping unit 140 performs the one-dimensional modulation, for example, the parity symbol XP generated by the second symbol mapping unit 140 from the parity bit BP is a PAM symbol of 4 values. Hereinafter, a PAM symbol of n values (n is positive integer) may be referred to as nPAM.

Figure 4:
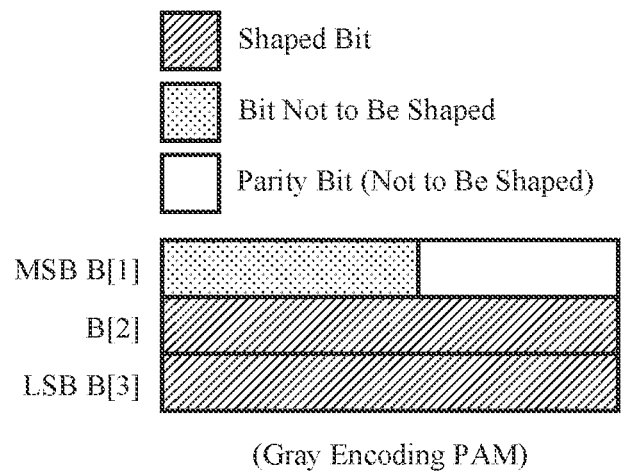
FIG. 4 is an explanatory diagram illustrating a data format of information generated by a conventional transmission code processing method.

FIG. 4 is an explanatory diagram illustrating one example of a data format of information generated by a conventional transmission code processing method (hereinafter, referred to as "conventional information") disclosed in "G. Boecherer*2 et al, "Bandwidth Efficient and Rate-Matched Low-Density Parity-Check Coded Modulation", IEEE Transactions on Communications, vol. 63, no. 12, pp. 4651-4665 Dec. 2015. (*2 "oe" in "Boecherer" is notation of umlaut "o" as "oe") ", which is "Non-Patent Literature 1" cited in "CITATION LIST".

As illustrated in FIG. 4, for example, Gray encoding is applied in the conventional transmission code processing method disclosed in Non-Patent Literature 1, and, for example, an 8PAM symbol, which is conventional information, may have a value of −7, −5, −3, −1, 1, 3, 5, or 7.

Figure 5:
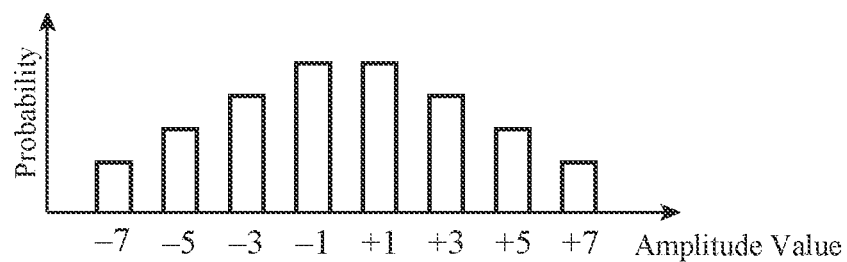
FIG. 5 is an explanatory diagram schematically illustrating combinations of bits, amplitude values, and probabilities for each of the amplitude values of an 8PAM symbol which is information generated by the conventional transmission code processing method.

FIG. 5 is an explanatory diagram schematically illustrating combinations of bits, amplitude values, and probabilities for each of the amplitude values of the 8PAM symbol which is information generated by the conventional transmission code processing method disclosed in Non-Patent Literature 1.

In the 8PAM symbol which is the conventional information, the most significant bit (MSB) in a bit system including three bits is used to switch the positive and negative polarities of the PAM symbol, and two lower bits excluding the MSB in the bit system are used to specify an absolute value of an amplitude of the PAM symbol.

In order to reduce a signal-to-noise ratio (SNR) necessary for obtaining desired communication quality in an additive white Gaussian noise (AWGN) communication path, the absolute value of the PAM symbol is preferably shaped in such a way as to achieve a distribution close to a discrete Gaussian distribution. For that reason, in the conventional transmission code processing method (hereinafter, simply referred to as "conventional transmission code processing method") disclosed in Non-Patent Literature 1, bits other than the MSB are shaped in such a way that an absolute value of the PAM symbol achieves a distribution close to the discrete Gaussian distribution.

Furthermore, the parity bit cannot be shaped, so that, in the conventional transmission code processing method, the parity bit is disposed in a predetermined MSB in an MSB region, and a part of communication target bits input from the outside without being shaped is allocated in a part having no parity bit of the MSB region.

In the conventional transmission code processing method, the parity bit cannot be transmitted under the condition of an absolute value of the PAM symbol being zero, so that the PAM symbol cannot have an absolute value of zero. For this reason, the conventional transmission code processing method cannot use the PAM symbol of an order smaller than that of a 4PAM symbol. Furthermore, in the conventional transmission code processing method, the PAM symbol may have a value of zero, so that a PAM symbol having an odd number of signal points cannot be generated.

In contrast, the transmission code processing device 100 according to the first embodiment regards all the bit systems as objects to be shaped, so that PAM symbols of eight values, seven values, six values, five values, four values, and three values can be generated.

The information symbol XI, which is the first modulation symbol generated by the first symbol mapping unit 130 of the transmission code processing device 100 according to the first embodiment, will be described with reference to FIG. 6.

Figure 6:
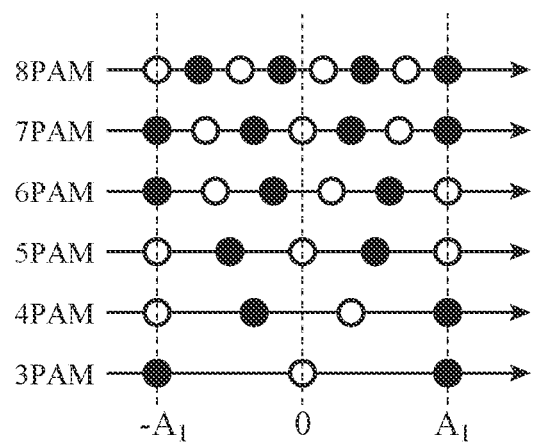
FIG. 6 is an explanatory diagram illustrating one example of a first modulation symbol generated by a first symbol mapping unit of the transmission code processing device according to the first embodiment.

FIG. 6 is an explanatory diagram illustrating one example of the information symbol XI, which is the first modulation symbol generated by the first symbol mapping unit 130 of the transmission code processing device 100 according to the first embodiment.

The information symbol XI generated by the first symbol mapping unit 130 is a PAM symbol.

For example, as illustrated in FIG. 6 as one example, the first symbol mapping unit 130 generates PAM symbols of eight values, seven values, six values, five values, four values, and three values. When a PAM symbol which is the information symbol XI generated by the first symbol mapping unit 130 has an odd number of signal points, the PAM symbol includes a signal point having an amplitude value of zero in a signal point set. Therefore, the first symbol mapping unit 130 can generate a PAM symbol having a minimum necessary number of signal points. The first symbol mapping unit 130 can increase the Euclidean distance between adjacent signal points in the PAM symbol by generating the PAM symbol having a minimum necessary number of signal points. Therefore, the first symbol mapping unit 130 can reduce a peak to average power ratio (hereinafter, referred to as "PAPR") of a signal for transmission based on the PAM symbol.

As a result, when transmitting a communication target bit string at a low information rate, the transmission code processing device 100 can generate a transmission signal with high theoretical performance without using a high QAM.

The parity symbol XP, which is the second modulation symbol generated by the second symbol mapping unit 140 of the transmission code processing device 100 according to the first embodiment, will be described with reference to FIG. 7.

Figure 7:
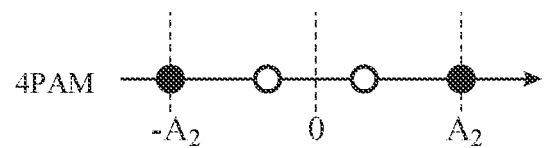
FIG. 7 is an explanatory diagram illustrating one example of a second modulation symbol generated by a second symbol mapping unit of the transmission code processing device according to the first embodiment.

FIG. 7 is an explanatory diagram illustrating one example of the parity symbol XP, which is the second modulation symbol generated by the second symbol mapping unit 140 of the transmission code processing device 100 according to the first embodiment.

For example, as illustrated in FIG. 7 as one example, the parity symbol XP generated by the second symbol mapping unit 140 is a PAM symbol in which signal points are uniformly distributed between amplitude values of $-A_2$ to $+A_2$. Considering that the theoretical performance is improved by performing the signal point arrangement shaping on the information symbol XI, the number of signal points of the parity symbol XP not to be shaped is preferably kept equal to or less than the number of signal points of the information symbol XI. That is, mp is preferably set to equal to or less than mi. Furthermore, cp is preferably set to equal to or less than ci.

For example, a known technique disclosed in T. Yoshida et. al ""Hierarchical Distribution Matching for Probabilistically Shaped Coded Modulation", Journal of Lightwave Technology, vol. 37, no. 6, pp. 1579-1589 Mar. 2019." can be applied to the signal point arrangement shaping encoding performed by the signal point arrangement shaping encoding unit 110.

The technique can strictly specify a signal point appearing in a PAM symbol, and can also shape an information symbol in such a way that an appearance probability of a signal point that can appear in the PAM symbol asymptotically approaches a Gaussian distribution. In contrast, in order to minimize a PAPR of a signal for transmission based on a PAM symbol, the technique can also shape the information symbol in such a way as to increase the appearance probability of a signal point having a large absolute value of an amplitude. In a probability distribution in FIG. 5, a portion having a small amplitude value of the PAM symbol has the highest probability and forms a mountain shape, whereas when the appearance probability of a signal point having a large absolute value of an amplitude is increased, a portion having a small amplitude value of the PAM symbol has the lowest probability and forms a valley shape.

Note that, in order to expand a loss budget in short-distance optical fiber transmission in which no optical amplifier or only a very small number, such as one and two, of optical amplifiers are included in an optical transmitter 1 and a device on a reception side (hereinafter, referred to as "receiver") and between the optical transmitter 1 and the receiver, the PAPR of a signal for transmission based on the PAM symbol is preferably reduced. For that reason, in the short-distance optical fiber transmission, A1, which is the maximum value of absolute values of amplitudes of the information symbol XI in FIG. 6 is preferably set to be equal to A2, which is the maximum value of absolute values of amplitudes of the parity symbol XP in FIG. 7.

In other words, the transmission code processing device 100 can expand the loss budget in the short-distance optical fiber transmission by setting the maximum value of absolute values of amplitudes of the information symbol XI to be equal to the maximum value of absolute values of amplitudes of the parity symbol XP.

A hardware configuration of the main part of the transmission code processing device 100 according to the first embodiment will be described with reference to FIG. 8.

Figure 8A:
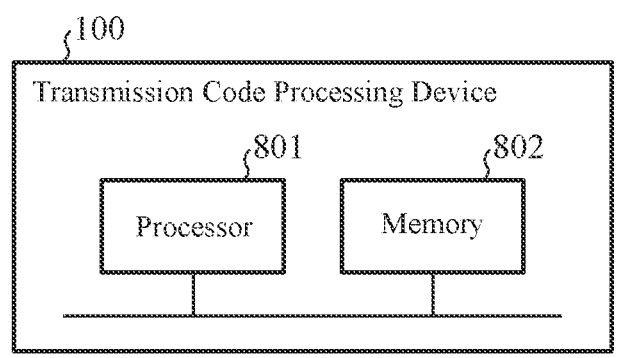
FIGS. 8A and 8B illustrate examples of a hardware configuration of the transmission code processing device according to the first embodiment.
Figure 8B:
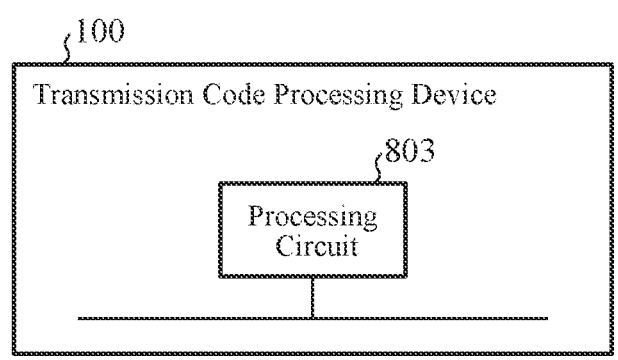

FIGS. 8A and 8B illustrate examples of a hardware configuration of the transmission code processing device 100 according to the first embodiment.

As illustrated in FIG. 8A, the transmission code processing device 100 is configured by a computer, and the computer includes a processor 801 and a memory 802. The memory 802 stores a program for causing the computer to function as the signal point arrangement shaping encoding unit 110, the systematic error correction encoding unit 120, the first symbol mapping unit 130, the second symbol mapping unit 140, and the symbol multiplexing unit 150. The processor 801 reads and executes the program stored in the memory 802, thereby implementing the functions of the signal point arrangement shaping encoding unit 110, the systematic error correction encoding unit 120, the first symbol mapping unit 130, the second symbol mapping unit 140, and the symbol multiplexing unit 150.

Furthermore, as illustrated in FIG. 8B, the transmission code processing device 100 may include a processing circuit 803. In this case, the processing circuit 803 may implement the functions of the signal point arrangement shaping encoding unit 110, the systematic error correction encoding unit 120, the first symbol mapping unit 130, the second symbol mapping unit 140, and the symbol multiplexing unit 150.

Furthermore, the transmission code processing device 100 may include the processor 801, the memory 802, and the processing circuit 803 (not illustrated). In this case, the processor 801 and the memory 802 may implement some of the functions of the signal point arrangement shaping encoding unit 110, the systematic error correction encoding unit 120, the first symbol mapping unit 130, the second symbol mapping unit 140, and the symbol multiplexing unit 150, and the processing circuit 803 may implement the remaining functions.

The processor 801 uses, for example, a central processing unit (CPU), a graphics processing unit (GPU), a microprocessor, a microcontroller, or a digital signal processor (DSP).

The memory 802 uses, for example, a semiconductor memory or a magnetic disk. More specifically, the memory 802 uses, for example, a random access memory (RAM), a read only memory (ROM), a flash memory, an erasable programmable read only memory (EPROM), an electrically erasable programmable read-only memory (EEPROM), a solid state drive (SSD), or a hard disk drive (HDD).

The processing circuit 803 uses, for example, an application specific integrated circuit (ASIC), a programmable logic device (PLD), a field-programmable gate array (FPGA), a system-on-a-chip (SoC), or system large-scale integration (LSI).

The operation of the transmission code processing device 100 according to the first embodiment will be described with reference to FIG. 9.

Figure 9:
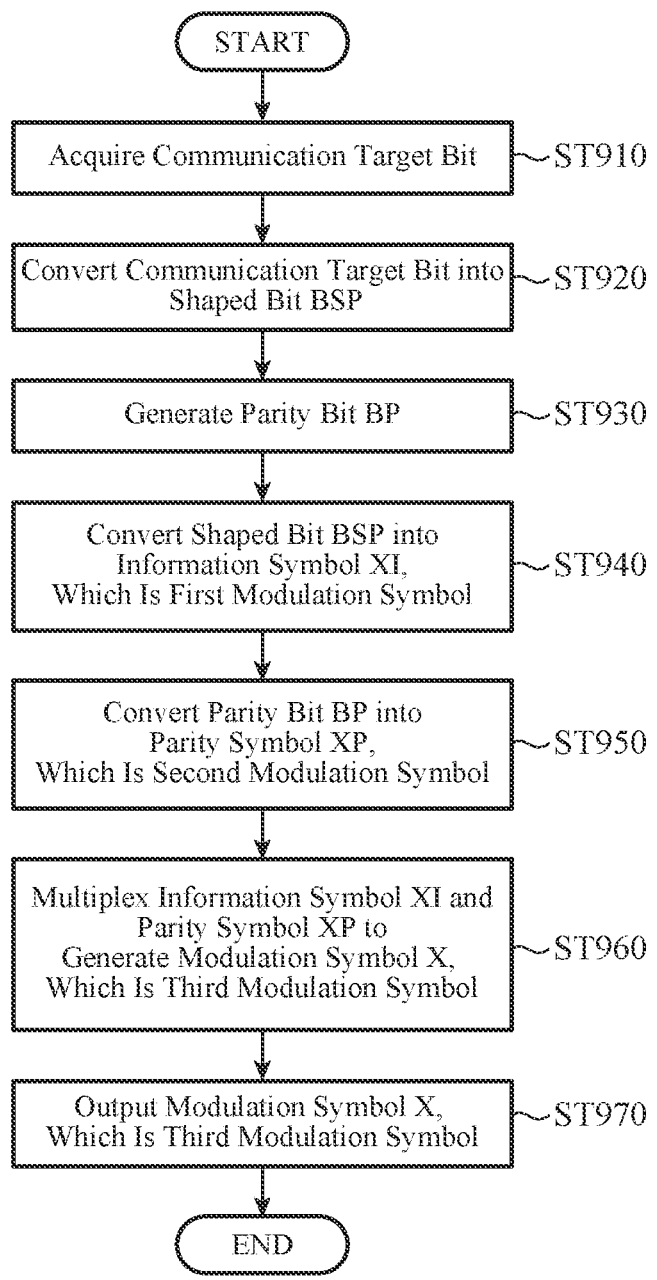
FIG. 9 is a flowchart illustrating one example of processing of the transmission code processing device according to the first embodiment.

FIG. 9 is a flowchart illustrating one example of processing of the transmission code processing device 100 according to the first embodiment.

The transmission code processing device 100 repeatedly executes the processing of the flowchart in FIG. 9.

First, in Step ST910, the signal point arrangement shaping encoding unit 110 acquires a communication target bit.

Next, in Step ST920, the signal point arrangement shaping encoding unit 110 converts the communication target bit into the shaped bit BSP.

Next, in Step ST930, the systematic error correction encoding unit 120 generates the parity bit BP based on the shaped bit BSP.

Next, in Step ST940, the first symbol mapping unit 130 converts the shaped bit BSP into the information symbol XI, which is the first modulation symbol.

Next, in Step ST950, the second symbol mapping unit 140 converts the parity bit BP into the parity symbol XP, which is the second modulation symbol.

Next, in Step ST960, the symbol multiplexing unit 150 generates the modulation symbol X, which is the third modulation symbol, by multiplexing the information symbol XI and the parity symbol XP.

Next, in Step ST970, the symbol multiplexing unit 150 outputs the modulation symbol X, which is the generated third modulation symbol.

After Step ST970, the transmission code processing device 100 ends the processing of the flowchart in FIG. 9, and the transmission code processing device 100 returns to the processing of Step ST910 and repeatedly executes the processing of the flowchart in FIG. 9.

Note that the processing of Step ST940 may be executed between the completion of the processing of Step ST920 and the execution of the processing of Step ST960.

Furthermore, when the processing of Step ST940 and the processing of Step ST950 are executed after the completion of the processing of Step ST930, the processing of Step ST940 and the processing of Step ST950 may be executed in any order, or may be executed in parallel by parallel processing.

As described above, the transmission code processing device 100 according to the first embodiment includes: a signal point arrangement shaping encoding unit 110 to perform signal point arrangement shaping encoding on a communication target bit input from an outside, and convert the communication target bit into a shaped bit BSP of mi column; a systematic error correction encoding unit 120 to perform systematic error correction encoding, by using, as an information bit, the shaped bit BSP obtained by conversion performed by the signal point arrangement shaping encoding unit 110, and generate a parity bit BP of mp column based on the shaped bit BSP; a first symbol mapping unit 130 to convert the shaped bit BSP obtained by conversion performed by the signal point arrangement shaping encoding unit 110, into a first modulation symbol; a second symbol mapping unit 140 to convert the parity bit BP generated by the systematic error correction encoding unit 120 into a second modulation symbol; and a symbol multiplexing unit 150 to generate a third modulation symbol by multiplexing the first modulation symbol obtained by conversion performed by the first symbol mapping unit 130 and the second modulation symbol obtained by conversion performed by the second symbol mapping unit 140, in which the first modulation symbol has one signal point element in a first signal point set sci including ci signal point including an origin, the second modulation symbol has one signal point element in a second signal point set scp including cp signal point not including the origin, and the signal point arrangement shaping encoding unit 110 performs signal point arrangement shaping in which the first modulation symbol has one signal point element included in the first signal point set sci.

With such configuration, when transmitting a communication target bit string at a low information rate, the transmission code processing device 100 can generate a transmission signal with high theoretical performance without using a high QAM.

Furthermore, as described above, the transmission code processing device 100 is configured in such a manner that mp is equal to or less than mi, in the above-mentioned configuration.

With such configuration, when transmitting a communication target bit string at a low information rate, the transmission code processing device 100 can generate a transmission signal with theoretical performance higher than that in a case where mp is larger than mi.

Furthermore, as described above, the transmission code processing device 100 is configured in such a manner that cp is equal to or less than ci, in the above-mentioned configuration.

With such configuration, when transmitting a communication target bit string at a low information rate, the transmission code processing device 100 can generate a transmission signal with theoretical performance higher than that in a case where cp is larger than ci.

Second Embodiment

A transmission code processing device 100a according to a second embodiment and an optical transmitter 1a in which the transmission code processing device 100a is used will be described with reference to FIGS. 10 to 16.

A configuration of a main part of the optical transmitter 1a according to the second embodiment will be described with reference to FIG. 10.

Figure 10:
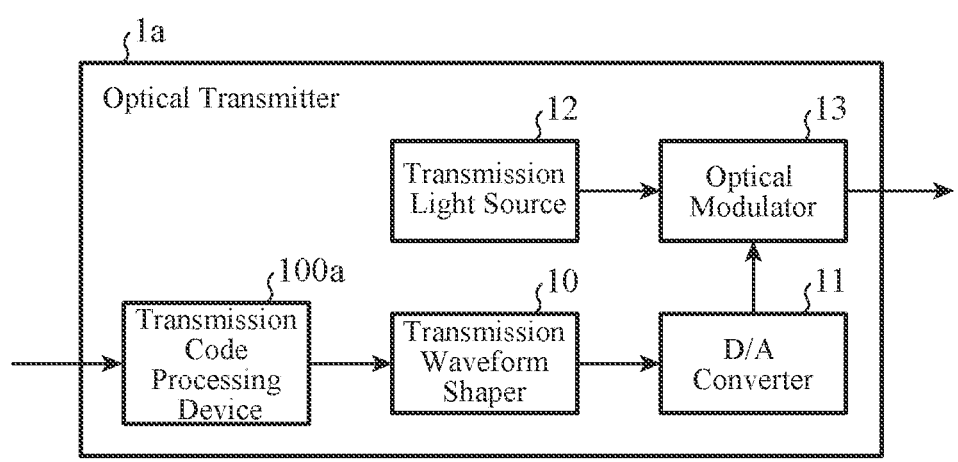
FIG. 10 is a configuration diagram illustrating one example of a configuration of a main part of an optical transmitter according to a second embodiment.

FIG. 10 is a configuration diagram illustrating one example of the configuration of the main part of the optical transmitter 1a according to the second embodiment.

The optical transmitter 1a includes the transmission code processing device 100a, a transmission waveform shaper 10, a D/A converter 11, a transmission light source 12, and an optical modulator 13.

The optical transmitter 1a according to the second embodiment is different from the optical transmitter 1 according to the first embodiment in that the transmission code processing device 100 according to the first embodiment is changed to the transmission code processing device 100a.

In FIG. 10, blocks similar to those in FIG. 1 are denoted by the same reference signs, and description thereof will be omitted.

The transmission code processing device 100a acquires a communication target bit input from the outside, and generates a modulation symbol X which is a PAM symbol on the basis of the acquired communication target bit. The transmission code processing device 100a outputs the generated modulation symbol X to the transmission waveform shaper 10.

A configuration of a main part of the transmission code processing device 100a according to the second embodiment will be described with reference to FIG. 11.

Figure 11:
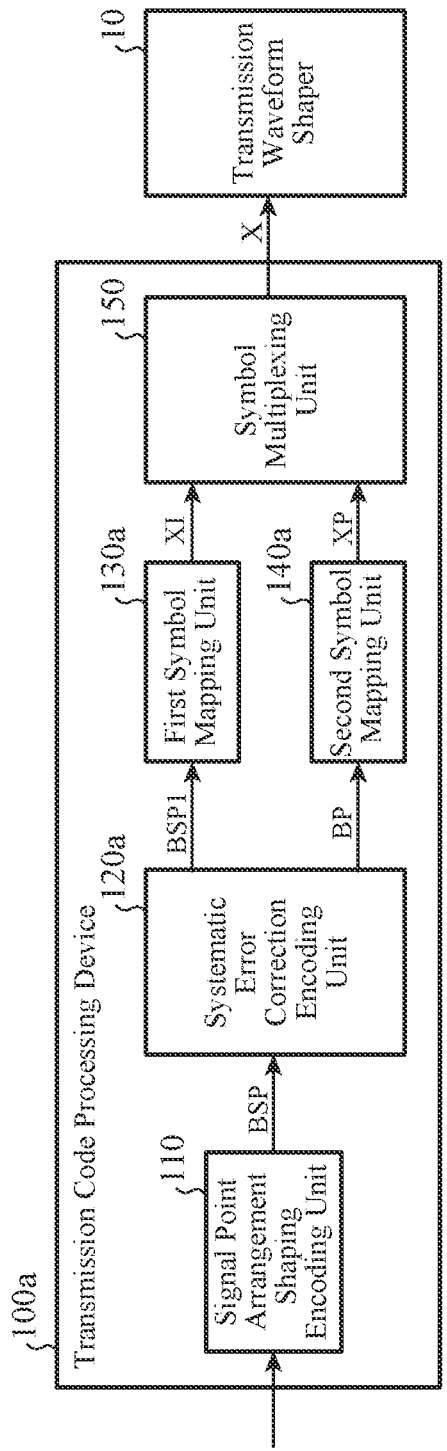
FIG. 11 is a configuration diagram illustrating one example of a configuration of a main part of a transmission code processing device according to the second embodiment.

FIG. 11 is a configuration diagram illustrating one example of the configuration of the main part of the transmission code processing device 100a according to the second embodiment.

The transmission code processing device 100a includes a signal point arrangement shaping encoding unit 110, a systematic error correction encoding unit 120a, a first symbol mapping unit 130a, a second symbol mapping unit 140a, and a symbol multiplexing unit 150.

The transmission code processing device 100a according to the second embodiment is different from the transmission code processing device 100 according to the first embodiment in that the systematic error correction encoding unit 120, the first symbol mapping unit 130, and the second symbol mapping unit 140 are changed to the systematic error correction encoding unit 120a, the first symbol mapping unit 130a, and the second symbol mapping unit 140a.

In FIG. 11, blocks similar to those in FIG. 2 are denoted by the same reference signs, and description thereof will be omitted.

Note that, in addition to the configuration, the transmission code processing device 100a may include a transmission waveform processing unit (not illustrated in FIG. 11) including the transmission waveform shaper 10, or may include a transmission waveform processing unit (not illustrated in FIG. 11) and a D/A conversion unit (not illustrated in FIG. 11) including the D/A converter 11. When the transmission code processing device 100a includes the transmission waveform processing unit in addition to the configuration, the optical transmitter 1a does not need to include the transmission waveform shaper 10, and when the transmission code processing device 100a includes the transmission waveform processing unit and the D/A conversion unit in addition to the configuration, the optical transmitter 1a does not need to include the transmission waveform shaper 10 and the D/A converter 11.

Hereinafter, description will be given on the assumption that the transmission code processing device 100a includes neither the transmission waveform processing unit nor the D/A conversion unit.

The systematic error correction encoding unit 120a performs systematic error correction encoding by using, as an information bit, the shaped bit BSP obtained by the conversion performed by the signal point arrangement shaping encoding unit 110, and generates a parity bit BP of mp columns based on the shaped bit BSP.

A configuration of a main part of the systematic error correction encoding unit 120a of the transmission code processing device 100a according to the second embodiment will be described with reference to FIG. 12.

Figure 12:
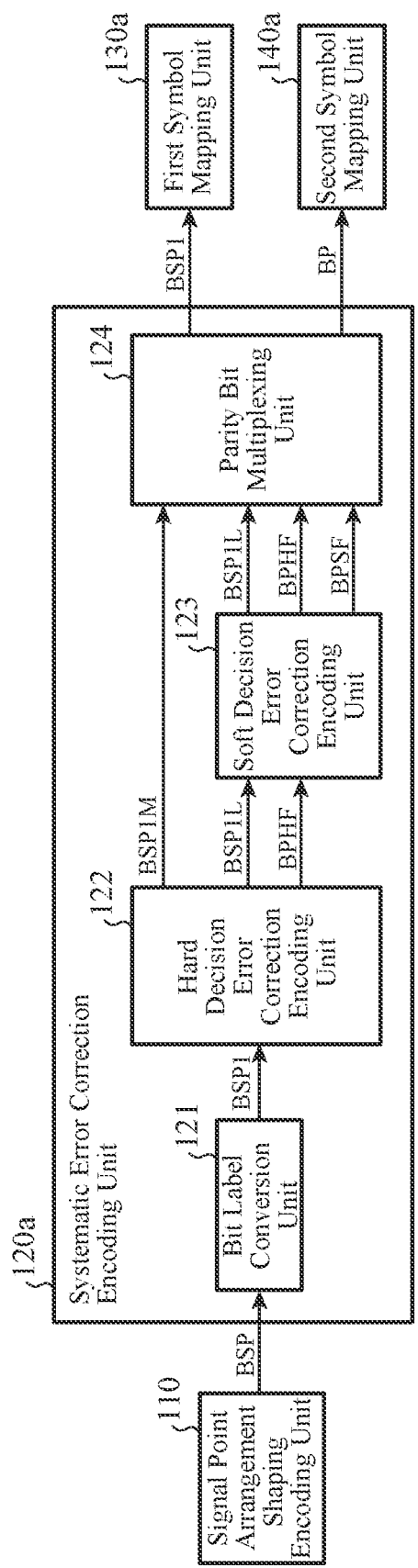
FIG. 12 is a configuration diagram illustrating one example of a configuration of a main part of a systematic error correction encoding unit of the transmission code processing device according to the second embodiment.

FIG. 12 is a configuration diagram illustrating one example of the configuration of the main part of the systematic error correction encoding unit 120a of the transmission code processing device 100a according to the second embodiment.

The systematic error correction encoding unit 120a includes a bit label conversion unit 121, a hard decision error correction encoding unit 122, a soft decision error correction encoding unit 123, and a parity bit multiplexing unit 124.

The coordinate of a signal point element in a first signal point set sci according to the second embodiment is expressed by a combination of Di (Di is an integer equal to or more than two) one-dimensional coordinates corresponding to the number of dimensions of a first information symbol.

The bit label conversion unit 121 associates a signal point element projected to one of the Di one-dimensional coordinates with bits of mil (mil is an integer equal to or more than one and equal to or less than mi) column, and performs bit allocation based on Gray encoding on a higher bit BSPIM excluding a BSPIL which is the least significant bit (LSB) in mil columns. Furthermore, the bit label conversion unit 121 performs bit allocation for set division on the LSB in the mil columns. As described above, the bit label conversion unit 121 generates a one-dimensional shaped bit (hereinafter, referred to as "one-dimensional shaped bit BSP1") of the mil columns.

The hard decision error correction encoding unit 122 performs systematic hard decision error correction encoding, by using, as information bits, all bits from the MSB to the LSB of the one-dimensional shaped bits BSP1 of the mil columns generated by the bit label conversion unit 121, and generates a hard decision error correction parity bit (hereinafter, referred to as "hard decision error correction parity bit BPHF").

The soft decision error correction encoding unit 123 performs systematic soft decision error correction encoding, by using, as information bits, both the BSPIL which is the LSB of the one-dimensional shaped bits BSP1 of mil columns generated by the bit label conversion unit 121 and the hard decision error correction parity bit BPHF generated by the hard decision error correction encoding unit 122, and generates a soft decision error correction parity bit (hereinafter, referred to as "soft decision error correction parity bit BPSF").

The parity bit multiplexing unit 124 generates a parity bit BP by multiplexing the hard decision error correction parity bit BPHF generated by the hard decision error correction encoding unit 122 and the soft decision error correction parity bit BPSF generated by the soft decision error correction encoding unit 123.

The configuration as described above causes the systematic error correction encoding unit 120a to generate the parity bit BP of mp columns based on the shaped bit BSP.

The first symbol mapping unit 130a converts the shaped bit BSP obtained by the conversion performed by the signal point arrangement shaping encoding unit 110 into the information symbol XI, which is the first modulation symbol.

Specifically, the first symbol mapping unit 130a converts the shaped bit BSP into the information symbol XI, by performing the bit allocation based on the Gray encoding on BSPIM which is a higher bit excluding the BSPIL being the LSB in the mil columns, and by performing symbol mapping on the BSPIL which is the LSB in the mil columns by using a rule satisfying the correspondence relation of bit to symbol for performing the bit allocation for the set division.

The second symbol mapping unit 140a converts the parity bit BP generated by the systematic error correction encoding unit 120a into the parity symbol XP which is the second modulation symbol.

Specifically, the second symbol mapping unit 140a converts the parity bit BP into the parity symbol XP by performing the symbol mapping using the Gray encoding.

The symbol multiplexing unit 150 generates a third modulation symbol which is the modulation symbol X, by multiplexing the information symbol XI, which is the first modulation symbol obtained by the conversion performed by the first symbol mapping unit 130a, and the parity symbol XP, which is the second modulation symbol obtained by the conversion performed by the second symbol mapping unit 140a. The symbol multiplexing unit 150 outputs the generated modulation symbol X, which is the third modulation symbol, to the transmission waveform shaper 10 of the optical transmitter 1a.

A data format of the modulation symbol X, which is the third modulation symbol generated by the symbol multiplexing unit 150 of the transmission code processing device 100a according to the second embodiment, will be described with reference to FIG. 13.

Figure 13:
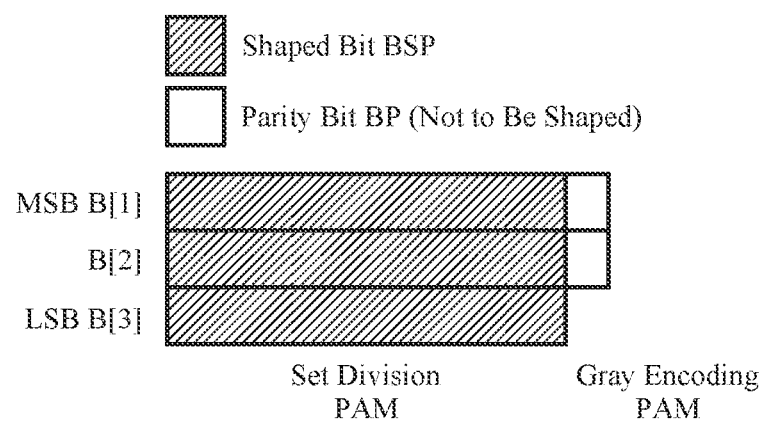
FIG. 13 is an explanatory diagram illustrating one example of a data format of a modulation symbol X which is a third modulation symbol generated by a symbol multiplexing unit of the transmission code processing device according to the second embodiment.

FIG. 13 is an explanatory diagram illustrating one example of the data format of the modulation symbol X, which is the third modulation symbol generated by the symbol multiplexing unit 150 of the transmission code processing device 100a according to the second embodiment.

FIG. 13 illustrates a data format of the modulation symbol X in a case of mi=3 and mp=2.

Note that, in the second embodiment, description will be given on the assumption that both the first symbol mapping unit 130a and the second symbol mapping unit 140a perform one-dimensional modulation. The modulation performed by the first symbol mapping unit 130a and the second symbol mapping unit 140a are not limited to the one-dimensional modulation, and may be multidimensional modulation.

A symbol mapping rule used by the first symbol mapping unit 130a of the transmission code processing device 100a according to the second embodiment will be described with reference to FIG. 14.

FIGS. 14A and 14B are explanatory diagrams illustrating examples of the symbol mapping rule used by the first symbol mapping unit 130a of the transmission code processing device 100a according to the second embodiment.

Specifically, FIG. 14 is an explanatory diagram illustrating one example of the correspondence relation between the one-dimensional shaped bits BSP1 and the information symbols XI which are one-dimensional PAM symbols.

For example, the symbol mapping rule shown in FIG. 14A can be used for symbol mapping on PAM symbols of four values, six values, eight values, 10 values, 12 values, 14 values, and 16 values. Furthermore, for example, the symbol mapping rule shown in FIG. 14B can be used for symbol mapping on PAM symbols of three values, five values, seven values, nine values, 11 values, 13 values, and 15 values.

For example, the bit label conversion unit 121 first generates a QAM signal of 25 values. Next, the bit label conversion unit 121 generates a PAM symbol of two systems by converting the generated QAM signal of 25 values into a PAM symbol of 5 values corresponding to each one-dimensional PAM symbol of two systems. The QAM signal of 25 values can be represented by the PAM symbol of two systems each having five values. Here, the PAM symbol of 5 values can be represented by three bits.

In the example, the bit label conversion unit 121 performs processing of decomposing a QAM signal of an integer value of 25 values from 0 to 24, which can be represented by 5 bits, into integer values of two systems using integer values of 5 values from 0 to 4, and converting the 5 values which are the integer values of the two systems obtained by the decomposition, into the PAM symbol of two systems each having three bits, that is, six bits in total.

In the symbol mapping rule in FIG. 14B, a signal point set of the PAM symbol of five values is {−4, −2, 0, 2, 4}, and bits corresponding to these signal points can be represented by {0010, 0001, 0000, 1001, 1000}, or {010, 001, 000, 101, 100} obtained by each excluding an unused bit being the second digit from the top, the unused bit being always zero.

Note that, although, in the example, the bit label conversion unit 121 has been described as generating the QAM signal of 25 values, the QAM signal generated by the bit label conversion unit 121 is not limited to having 25 values, and may have nine values, or 49 values, for example.

The configuration as described above enables the first symbol mapping unit 130a to generate a PAM symbol having a minimum necessary number of signal points. The first symbol mapping unit 130a can increase the Euclidean distance between adjacent signal points in the PAM symbol by generating the PAM symbol having a minimum necessary number of signal points. Therefore, the first symbol mapping unit 130 can reduce the PAPR of a signal for transmission based on the PAM symbol.

As a result, when transmitting a communication target bit string at a low information rate, the transmission code processing device 100a can perform optical fiber transmission with small performance degradation by reducing performance degradation on circuit mounting or performance degradation on hardware mounting, while generating a transmission signal with high theoretical performance without using a high QAM.

Note that the transmission code processing device 100a can change the information rate at a fine granularity by controlling the appearance probability of each signal point or mixing PAM symbols having different number of signal points, while using, as a prototype, the PAM symbol having a minimum necessary number of signal points.

An information bit region and a parity bit region for error correction in a data format of the modulation symbol X which is the third modulation symbol generated by the symbol multiplexing unit 150 of the transmission code processing device 100a according to the second embodiment, will be described with reference to FIG. 15.

Figure 15A:
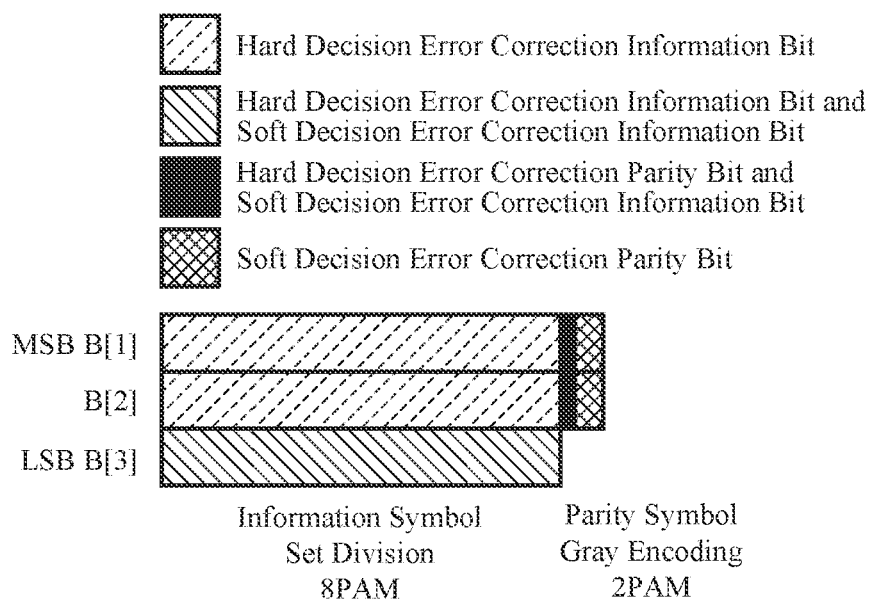
FIGS. 15A and 15B are explanatory diagrams illustrating examples of divisions of an information bit region and a parity bit region for error correction in the data format of the modulation symbol X which is the third modulation symbol generated by the symbol multiplexing unit of the transmission code processing device according to the second embodiment.
Figure 15B:
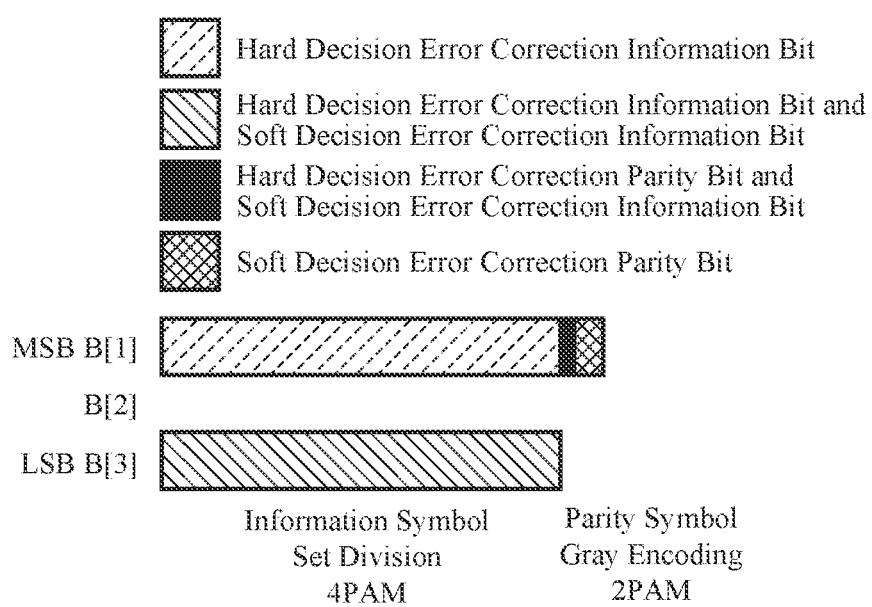

FIGS. 15A and 15B are explanatory diagrams illustrating examples of divisions of the information bit region and the parity bit region for error correction in the data format of the modulation symbol X, which is the third modulation symbol generated by the symbol multiplexing unit 150 of the transmission code processing device 100a according to the second embodiment.

The hard decision error correction encoding unit 122 performs systematic hard decision error correction encoding to protect bits in all regions excluding the soft decision error correction parity bit BPSF. The soft decision error correction encoding unit 123 performs systematic soft decision error correction encoding to protect a BSP1L, which is the LSB of the one-dimensional shaped bit BSP1, and the hard decision error correction parity bit BPHF.

The data format of the modulation symbol X shown in FIG. 15A is one example of a data format in a case where the information symbol XI is a PAM symbol of up to eight values and the parity symbol XP is a PAM symbol of four values. The data format of the modulation symbol X in FIG. 15B is one example of a data format in a case where the information symbol XI is a PAM symbol of up to four values and the parity symbol XP is a PAM symbol of two values.

The transmission code processing device 100a according to the second embodiment uses multi-level encoding for protecting different signal regions, with two codes having different strengths of hard decision error correction and soft decision error correction. The receiver, which is a device on the reception side, performs multi-stage decoding in a procedure opposite to that of the multi-level encoding performed by the systematic error correction encoding unit 120a of the transmission code processing device 100a. The multi-level encoding and multi-stage decoding as described above enables reduction of a protection region by the soft decision error correction. For that reason, power consumption in soft decision error correction decoding which particularly consumes much power can be reduced, by using the optical transmitter 1a in which the transmission code processing device 100a is used.

Note that each of the functions of the signal point arrangement shaping encoding unit 110, the systematic error correction encoding unit 120a, the first symbol mapping unit 130a, the second symbol mapping unit 140a, and the symbol multiplexing unit 150 of the transmission code processing device 100a according to the second embodiment may be implemented by the processor 801 and the memory 802, or may be implemented by the processing circuit 803, in the hardware configuration exemplified in FIGS. 8A and 8B in the first embodiment.

The operation of the transmission code processing device 100a according to the second embodiment will be described with reference to FIG. 16.

Figure 16A:
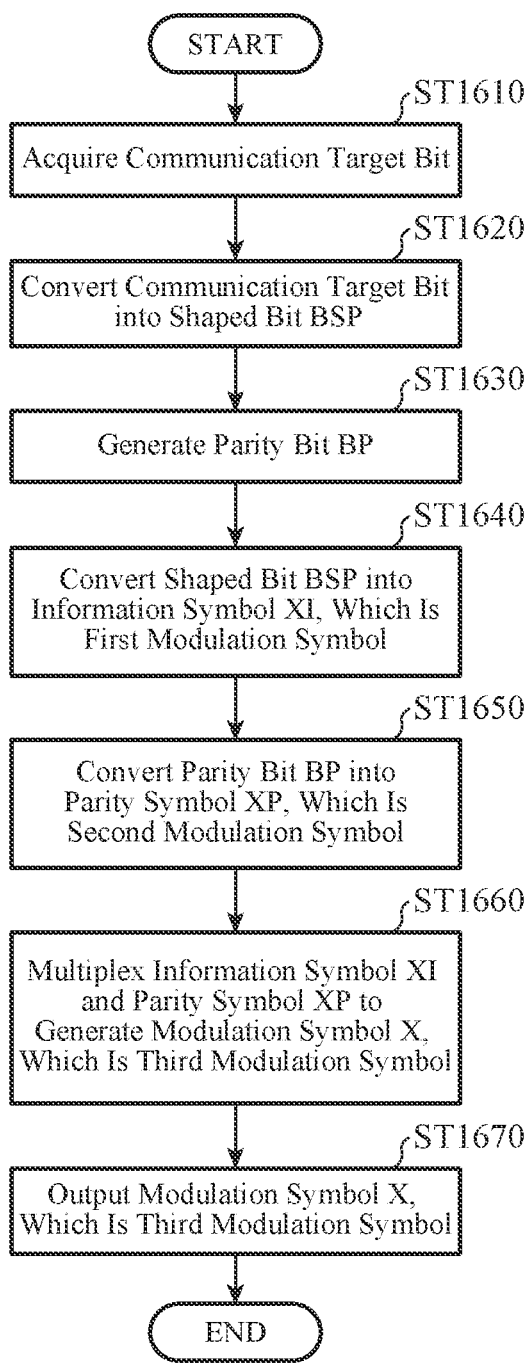
FIG. 16A is a flowchart illustrating one example of processing of the transmission code processing device 100a according to the second embodiment.

FIG. 16A is a flowchart illustrating one example of processing of the transmission code processing device 100a according to the second embodiment.

The transmission code processing device 100a repeatedly executes the processing of the flowchart in FIG. 16A.

First, in Step ST1610, the signal point arrangement shaping encoding unit 110 acquires a communication target bit.

Next, in Step ST1620, the signal point arrangement shaping encoding unit 110 converts the communication target bit into the shaped bit BSP.

Next, in Step ST1630, the systematic error correction encoding unit 120a generates the parity bit BP based on the shaped bit BSP.

Next, in Step ST1640, the first symbol mapping unit 130a converts the shaped bit BSP into the information symbol XI, which is the first modulation symbol.

Next, in Step ST1650, the second symbol mapping unit 140a converts the parity bit BP into the parity symbol XP, which is the second modulation symbol.

Next, in Step ST1660, the symbol multiplexing unit 150 generates the modulation symbol X, which is the third modulation symbol by multiplexing the information symbol XI and the parity symbol XP.

Next, in Step ST1670, the symbol multiplexing unit 150 outputs the modulation symbol X, which is the generated third modulation symbol.

After Step ST1670, the transmission code processing device 100a ends the processing of the flowchart in FIG. 16A, and the transmission code processing device 100a returns to the processing of Step ST1610 and repeatedly executes the processing of the flowchart in FIG. 16A.

Note that the processing of Step ST1640 may be executed between the completion of the processing of Step ST1620 and the execution of the processing of Step ST1660.

Furthermore, when the processing of Step ST1640 and the processing of Step ST1650 are executed after the completion of the processing of Step ST1630, the processing of Step ST1640 and the processing of Step ST1650 may be executed in any order, or may be executed in parallel by parallel processing.

Figure 16B:
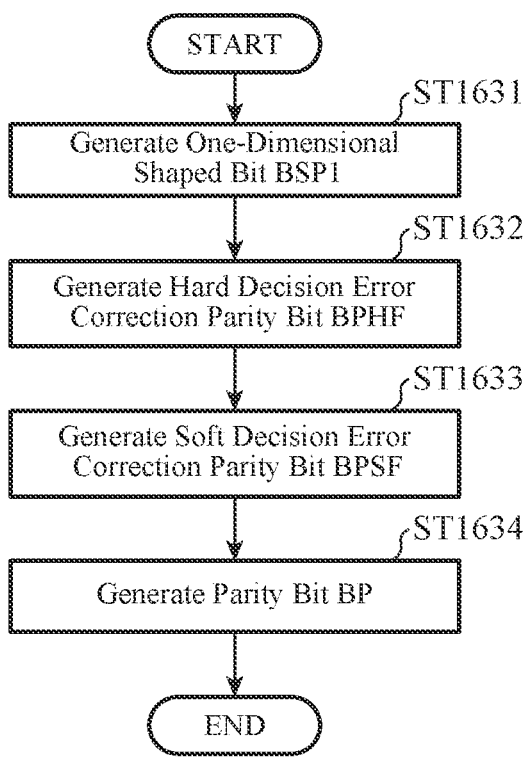
FIG. 16B is a flowchart illustrating one example of processing performed by the systematic error correction encoding unit 120a of the transmission code processing device 100a according to the second embodiment.

FIG. 16B is a flowchart illustrating one example of processing performed by the systematic error correction encoding unit 120a of the transmission code processing device 100a according to the second embodiment.

Specifically, FIG. 16B is a flowchart illustrating one example of internal processing in Step ST1630 in FIG. 16A.

After Step ST1620 in FIG. 16A, first, in Step ST1631, the bit label conversion unit 121 generates the one-dimensional shaped bit BSP1.

Next, in Step ST1632, the hard decision error correction encoding unit 122 generates the hard decision error correction parity bit BPHF.

Next, in Step ST1633, the soft decision error correction encoding unit 123 generates the soft decision error correction parity bit BPSF.

Next, in Step ST1634, the parity bit multiplexing unit 124 generates the parity bit BP by multiplexing the hard decision error correction parity bit BPHF and the soft decision error correction parity bit BPSF.

After Step ST1634, the systematic error correction encoding unit 120a ends the processing of the flowchart in FIG. 16B, and the transmission code processing device 100a executes the processing of Step ST1640 in FIG. 16A.

As described above, the transmission code processing device 100a according to the second embodiment includes: a signal point arrangement shaping encoding unit 110 to perform signal point arrangement shaping encoding on a communication target bit input from an outside, and convert the communication target bit into a shaped bit BSP of mi column; a systematic error correction encoding unit 120a to perform systematic error correction encoding, by using, as an information bit, the shaped bit BSP obtained by conversion performed by the signal point arrangement shaping encoding unit 110, and generate a parity bit BP of mp column based on the shaped bit BSP; a first symbol mapping unit 130a to convert the shaped bit BSP obtained by conversion performed by the signal point arrangement shaping encoding unit 110, into a first modulation symbol; a second symbol mapping unit 140a to convert the parity bit BP generated by the systematic error correction encoding unit 120a into a second modulation symbol; and a symbol multiplexing unit 150 to generate a third modulation symbol by multiplexing the first modulation symbol obtained by conversion performed by the first symbol mapping unit 130a and the second modulation symbol obtained by conversion performed by the second symbol mapping unit 140a, in which the first modulation symbol has one signal point element in a first signal point set sci including ci signal point including an origin, the second modulation symbol has one signal point element in a second signal point set scp including cp signal point not including the origin, and the signal point arrangement shaping encoding unit 110 performs signal point arrangement shaping in which the first modulation symbol has one signal point element included in the first signal point set sci.

Moreover, in the transmission code processing device 100a according to the second embodiment, in the above-mentioned configuration, a coordinate of the signal point element included in the first signal point set sci is expressed by a combination of Di (Di is an integer equal to or more than two) one-dimensional coordinates corresponding to the number of dimensions of a first information symbol, and the systematic error correction encoding unit 120a includes: a bit label conversion unit 121 to generate the one-dimensional shaped bit BSP1 of mil column, by associating the signal point element projected to one of the Di one-dimensional coordinates with a bit of the mil column, performing bit allocation based on Gray encoding on a higher bit BSP1M excluding a least significant bit BSPIL in the mil column, and performing bit allocation for set division on the least significant bit BSPIL in the mil column; a hard decision error correction encoding unit 122 to perform systematic hard decision error correction encoding by using, as information bits, all bits from most significant to least significant of the one-dimensional shaped bit BSP1 of the mil column generated by the bit label conversion unit 121, and generate a hard decision error correction parity bit BPHF; a soft decision error correction encoding unit 123 to perform systematic soft decision error correction encoding by using, as information bits, the least significant bit BSP1L of the one-dimensional shaped bit BSP1 of the mil column generated by the bit label conversion unit 121 and the hard decision error correction parity bit BPHF generated by the hard decision error correction encoding unit 122, and generate a soft decision error correction parity bit BPSF; and a parity bit multiplexing unit 124 to generate the parity bit BP by multiplexing the hard decision error correction parity bit BPHF generated by the hard decision error correction encoding unit 122 and the soft decision error correction parity bit BPSF generated by the soft decision error correction encoding unit 123.

With such configuration, when transmitting a communication target bit string at a low information rate, the transmission code processing device 100a can generate a transmission signal with high theoretical performance without using a high QAM.

Furthermore, with such configuration, the transmission code processing device 100a uses multi-level encoding for protecting different signal regions, with two codes having different strengths of hard decision error correction and soft decision error correction. The multi-level encoding enables the transmission code processing device 100a to reduce a protection region by soft decision error correction. As a result, the transmission code processing device 100a can reduce power consumption in soft decision error correction decoding which particularly consumes much power in a device on the reception side.

Furthermore, as described above, in the configuration, the transmission code processing device 100a according to the second embodiment is configured in such a manner that: the first symbol mapping unit 130a performs symbol mapping using a rule satisfying the correspondence relation of bit to symbol, by performing bit allocation based on the Gray encoding on the higher bit BSPIM excluding the BSPIL which is the least significant bit in the mil column, and by performing bit allocation for set division on the BSPIL which is the least significant bit in the mil column to convert the shaped bit BSP into the first modulation symbol; and the second symbol mapping unit 140a performs the symbol mapping based on the Gray encoding to convert the parity bit BP into the second modulation symbol.

With such configuration, when transmitting a communication target bit string at a low information rate, the transmission code processing device 100a can generate a transmission signal with high theoretical performance without using a high QAM.

Furthermore, such configuration enables the transmission code processing device 100a to reduce the number of signal points to the minimum necessary. Reducing the number of signal points to the minimum necessary enables the transmission code processing device 100a to increase the Euclidean distance between adjacent signal points in the PAM symbol and reduce the PAPR of a signal for transmission based on the PAM symbol. As a result, when transmitting a communication target bit string at a low information rate, the transmission code processing device 100a can perform optical fiber transmission with small performance degradation by reducing performance degradation on circuit mounting or performance degradation on hardware mounting, while generating a transmission signal with high theoretical performance without using a high QAM.

Third Embodiment

A transmission code processing device 100b according to a third embodiment and an optical transmitter 1b in which the transmission code processing device 100b is used will be described with reference to FIGS. 17 to 20.

A configuration of a main part of the optical transmitter 1b according to the third embodiment will be described with reference to FIG. 17.

Figure 17:
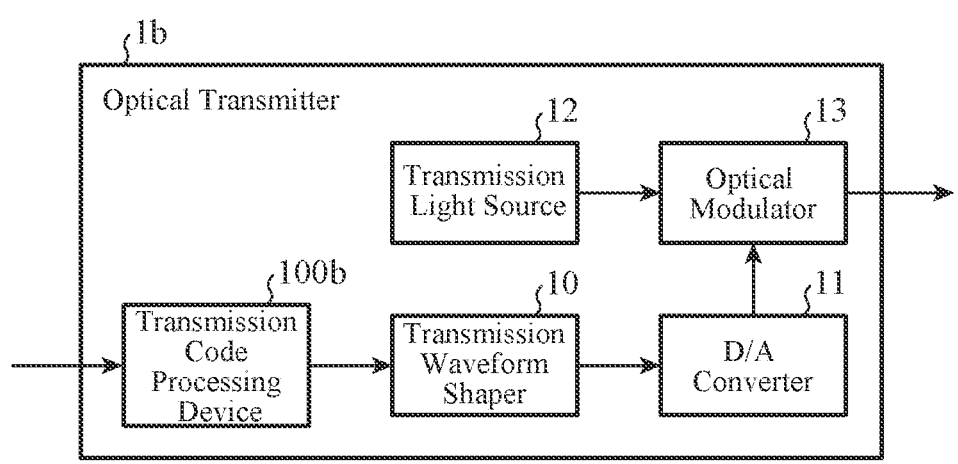
FIG. 17 is a configuration diagram illustrating one example of a configuration of a main part of an optical transmitter according to a third embodiment.

FIG. 17 is a configuration diagram illustrating one example of the configuration of the main part of the optical transmitter 1b according to the third embodiment.

The optical transmitter 1b includes the transmission code processing device 100b, a transmission waveform shaper 10, a D/A converter 11, a transmission light source 12, and an optical modulator 13.

The optical transmitter 1b according to the third embodiment is different from the optical transmitter 1 according to the first embodiment in that the transmission code processing device 100 according to the first embodiment is changed to the transmission code processing device 100b.

In FIG. 17, blocks similar to those in FIG. 1 are denoted by the same reference signs, and description thereof will be omitted.

The transmission code processing device 100b acquires a communication target bit input from the outside, and generates a modulation symbol X which is a PAM symbol on the basis of the acquired communication target bit. The transmission code processing device 100b outputs the generated modulation symbol X to the transmission waveform shaper 10.

A configuration of a main part of the transmission code processing device 100b according to the third embodiment will be described with reference to FIG. 18.

Figure 18:
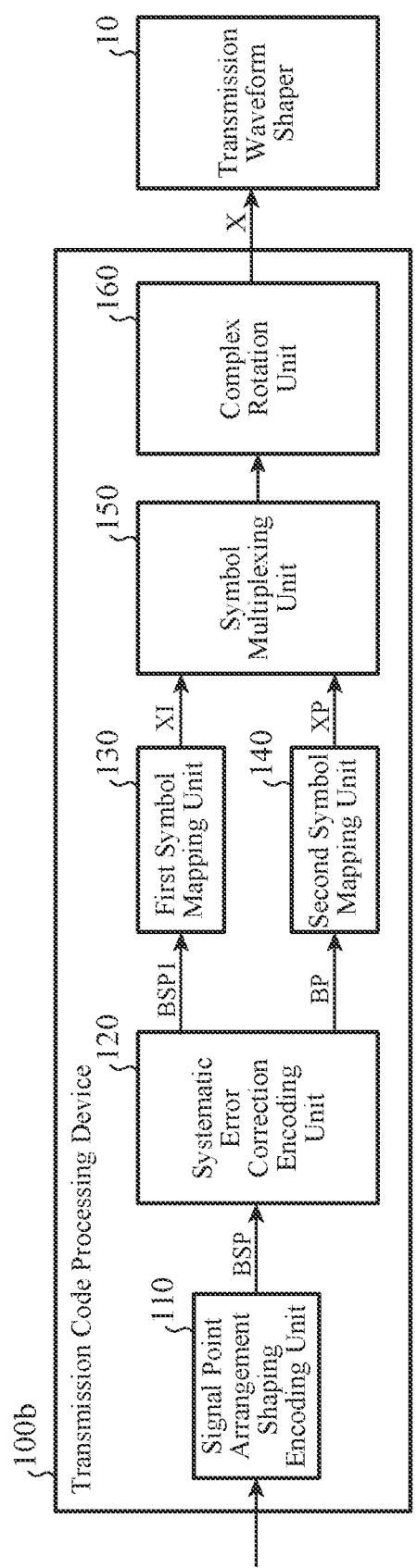
FIG. 18 is a configuration diagram illustrating one example of a configuration of a main part of a transmission code processing device according to the third embodiment.

FIG. 18 is a configuration diagram illustrating one example of the configuration of the main part of the transmission code processing device 100b according to the third embodiment.

The transmission code processing device 100b includes a signal point arrangement shaping encoding unit 110, a systematic error correction encoding unit 120, a first symbol mapping unit 130, a second symbol mapping unit 140, a symbol multiplexing unit 150, and a complex rotation unit 160.

The transmission code processing device 100b according to the third embodiment is different from the transmission code processing device 100 according to the first embodiment in that the complex rotation unit 160 is added.

In FIG. 18, blocks similar to those in FIG. 2 are denoted by the same reference signs, and description thereof will be omitted.

Note that, in addition to the configuration, the transmission code processing device 100b may include a transmission waveform processing unit (not illustrated in FIG. 18) including the transmission waveform shaper 10, or may include a transmission waveform processing unit (not illustrated in FIG. 18) and a D/A conversion unit (not illustrated in FIG. 18) including the D/A converter 11. When the transmission code processing device 100b includes the transmission waveform processing unit in addition to the configuration, the optical transmitter 1b does not need to include the transmission waveform shaper 10, and when the transmission code processing device 100b includes the transmission waveform processing unit and the D/A conversion unit in addition to the configuration, the optical transmitter 1*b* does not need to include the transmission waveform shaper 10 and the D/A converter 11.

Hereinafter, description will be given on the assumption that the transmission code processing device 100*b* includes neither the transmission waveform processing unit nor the D/A conversion unit.

Furthermore, the transmission code processing device 100*b* may include the systematic error correction encoding unit 120*a*, the first symbol mapping unit 130*a*, and the second symbol mapping unit 140*a* of the transmission code processing device 100*a* according to the second embodiment, instead of the systematic error correction encoding unit 120, the first symbol mapping unit 130, and the second symbol mapping unit 140.

Hereinafter, description will be given on the assumption that the transmission code processing device 100*b* includes the systematic error correction encoding unit 120, the first symbol mapping unit 130, and the second symbol mapping unit 140.

The symbol multiplexing unit 150 generates a third modulation symbol, by multiplexing the information symbol XI which is the first modulation symbol obtained by the conversion performed by the first symbol mapping unit 130, and the parity symbol XP which is the second modulation symbol obtained by the conversion performed by the second symbol mapping unit 140. The symbol multiplexing unit 150 outputs the generated third modulation symbol to the complex rotation unit 160. The complex rotation unit 160 generates the modulation symbol X by giving any complex rotation to the third modulation symbol generated by the symbol multiplexing unit 150 in such a way that the PAPR for each dimension is decreased. The complex rotation unit 160 outputs the generated modulation symbol X to the transmission waveform shaper 10 of the optical transmitter 1*b*.

The arrangement of signal points on a complex plane in the modulation symbol X generated by the complex rotation unit 160 of the transmission code processing device 100*b* according to the third embodiment will be described with reference to FIG. 19.

Figure 19A:
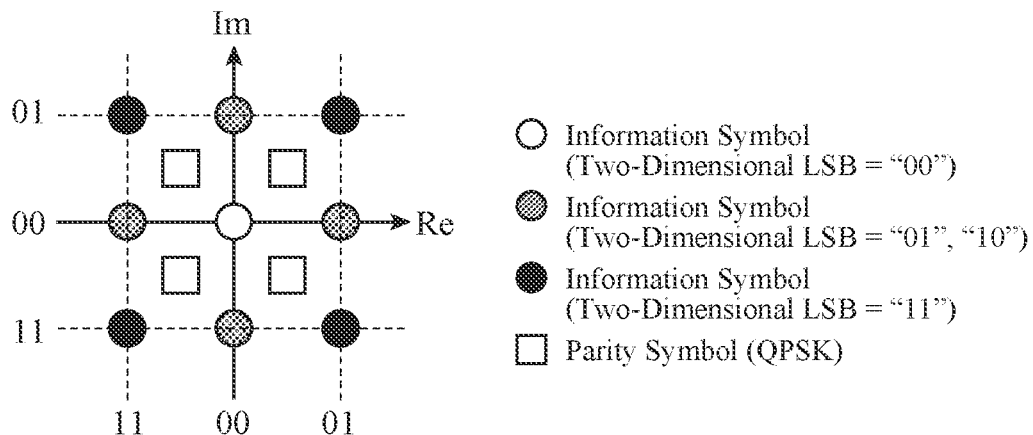
FIG. 19A is an explanatory diagram illustrating one example of the arrangement of signal points on a complex plane in a third modulation symbol output from a symbol multiplexing unit of the transmission code processing device according to the third embodiment to a complex rotation unit.

FIG. 19A is an explanatory diagram illustrating one example of the arrangement of signal points on the complex plane in the third modulation symbol output from the symbol multiplexing unit 150 of the transmission code processing device 100*b* according to the third embodiment to the complex rotation unit 160.

Specifically, in the arrangement of signal points on the complex plane in the third modulation symbol in FIG. 19A, the information symbol XI in the third modulation symbol output from the symbol multiplexing unit 150 to the complex rotation unit 160 is a QAM symbol of nine values.

The information symbol XI in the third modulation symbol output from the symbol multiplexing unit 150 to the complex rotation unit 160 is not limited to the QAM symbol of nine values.

Hereinafter, the information symbol XI in the third modulation symbol output from the symbol multiplexing unit 150 to the complex rotation unit 160 will be described as being the QAM symbol of nine values.

When the information symbol XI in the third modulation symbol output from the symbol multiplexing unit 150 to the complex rotation unit 160 is a QAM symbol of nine values, the information symbol XI is a PAM symbol of three values for each dimension. Note that the correspondence relation between the one-dimensional shaped bit BSP1 and the PAM symbol of three values, which is the information symbol XI, conforms to the symbol mapping rule in FIG. 14B. That is, when the information symbol XI has a value of "2", the one-dimensional shaped bit BSP1 is "0001", and when "0001" is expressed by only the first and fourth digits thereof, the one-dimensional shaped bit BSP1 is "01". Furthermore, when the information symbol XI has a value of "0", the one-dimensional shaped bit BSP1 is "0000", and when "0000" is expressed by only the first and fourth digits thereof, the one-dimensional shaped bit BSP1 is "00". Furthermore, when the information symbol XI has a value of "−2", the one-dimensional shaped bit BSP1 is "1001", and when "1001" is expressed by only the first and fourth digits thereof, the one-dimensional shaped bit BSP1 is "11".

Furthermore, the parity symbol XP in the third modulation symbol output from the symbol multiplexing unit 150 to the complex rotation unit 160 is four-value phase modulation (hereinafter, referred to as quadrature phase shift keying (QPSK)). When the parity symbol XP is QPSK, the parity symbol XP is a PAM symbol of two values for each dimension. Hereinafter, the PAM of two values has a signal coordinate of "1" or "−1".

Figure 19B:
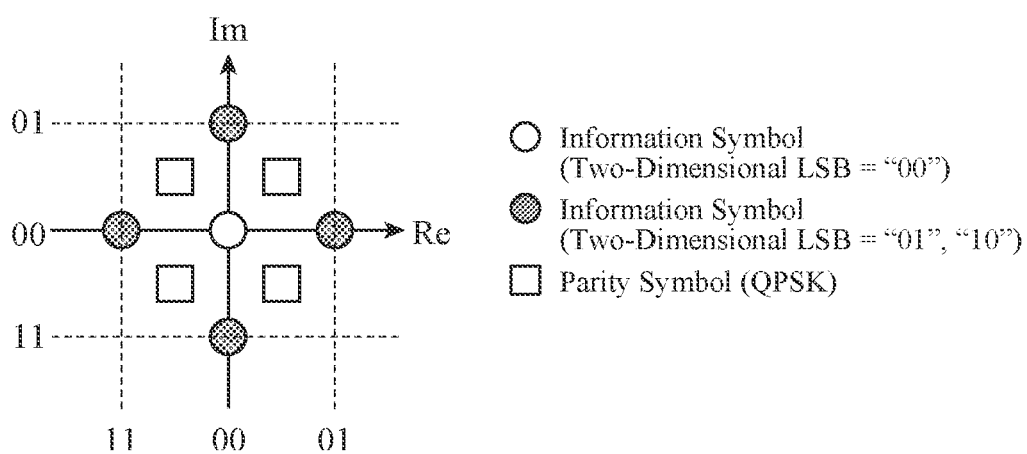
FIG. 19B is an explanatory diagram illustrating one example of the arrangement of signal points on the complex plane in the third modulation symbol output from the symbol multiplexing unit of the transmission code processing device according to the third embodiment to the complex rotation unit 160.

FIG. 19B is an explanatory diagram illustrating one example of the arrangement of signal points on the complex plane in the third modulation symbol output from the symbol multiplexing unit 150 of the transmission code processing device 100*b* according to the third embodiment to the complex rotation unit 160.

Specifically, in the arrangement of signal points on the complex plane in the third modulation symbol in FIG. 19B, the information symbol XI in the third modulation symbol output from the symbol multiplexing unit 150 to the complex rotation unit 160 is a QAM symbol of five values.

The arrangement of signal points on a complex plane in the third modulation symbol in FIG. 19B is equal to the arrangement of signal points on the complex plane in the third modulation symbol in FIG. 19A excluding four points indicated by solid circles.

Figure 19C:
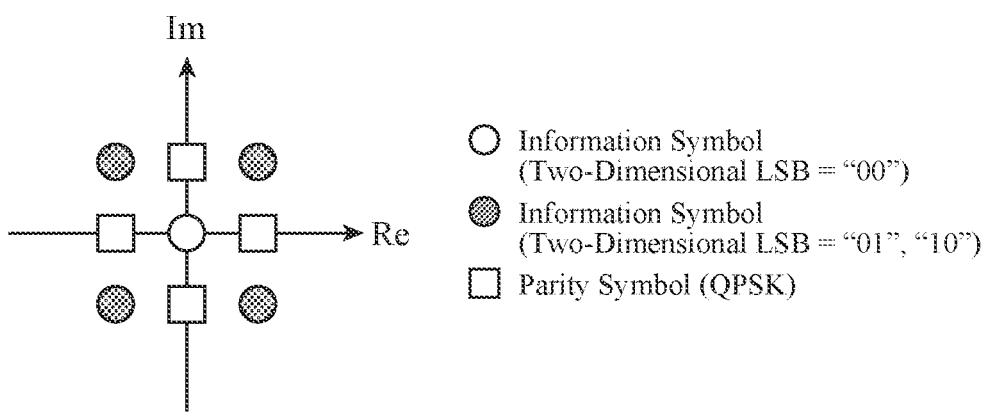
FIG. 19C is an explanatory diagram illustrating one example of the arrangement of signal points on the complex plane in a modulation symbol generated by the complex rotation unit of the transmission code processing device according to the third embodiment.

FIG. 19C is an explanatory diagram illustrating one example of the arrangement of signal points on a complex plane in the modulation symbol X generated by the complex rotation unit 160 of the transmission code processing device 100*b* according to the third embodiment.

The complex rotation unit 160 reduces the PAPR for each dimension of a signal for transmission based on the PAM symbol, by rotating, by, for example, 45 degrees on the complex plane, phases of signal points of the information symbol XI in the third modulation symbol among the signal points on the complex plane in the third modulation symbol in FIG. 19B.

The complex rotation unit 160 gives complex rotation to the third modulation symbol generated by the symbol multiplexing unit 150, so that the transmission code processing device 100*b* can reduce the PAPR per dimension of a signal for transmission based on the PAM symbol as compared with that before the complex rotation.

Specifically, for example, the complex rotation unit 160 gives complex rotation to the third modulation symbol, and thus changes the arrangement of signal points in FIG. 19B to the arrangement of signal points in FIG. 19C, so that the transmission code processing device 100*b* can reduce the PAPR per dimension of a signal for transmission based on the PAM symbol by half as compared with that before the complex rotation.

Note that, as described in the first embodiment, the transmission code processing device 100*b* may control the appearance probability of each signal point while using, as a prototype, a QAM symbol of five values, a QAM symbol of nine values, or the like. The transmission code processing device 100b controls the appearance probability of each signal point while using, as a prototype, for example, a QAM symbol of five values or a QAM symbol of nine values, so that the transmission code processing device 100b can further reduce the PAPR of a signal for transmission based on the PAM symbol as compared with that in a case where a QAM symbol of 16 values is used as a prototype in a conventional transmission code processing method. As a result, when transmitting a communication target bit string at a low information rate, the transmission code processing device 100b can further reduce the performance degradation on a circuit mounting or performance degradation on hardware mounting, while generating a transmission signal with high theoretical performance without using a high QAM. Note that transmission of a signal based on a QAM symbol of five values or a QAM symbol of nine values is useful for ultra-long distance optical fiber transmission.

Note that each of the functions of the signal point arrangement shaping encoding unit 110, the systematic error correction encoding unit 120, the first symbol mapping unit 130, the second symbol mapping unit 140, the symbol multiplexing unit 150, and the complex rotation unit 160 of the transmission code processing device 100b according to the third embodiment may be implemented by the processor 801 and the memory 802, or may be implemented by the processing circuit 803, in the hardware configuration exemplified in FIGS. 8A and 8B in the first embodiment.

The operation of the transmission code processing device 100b according to the third embodiment will be described with reference to FIG. 20.

Figure 20:
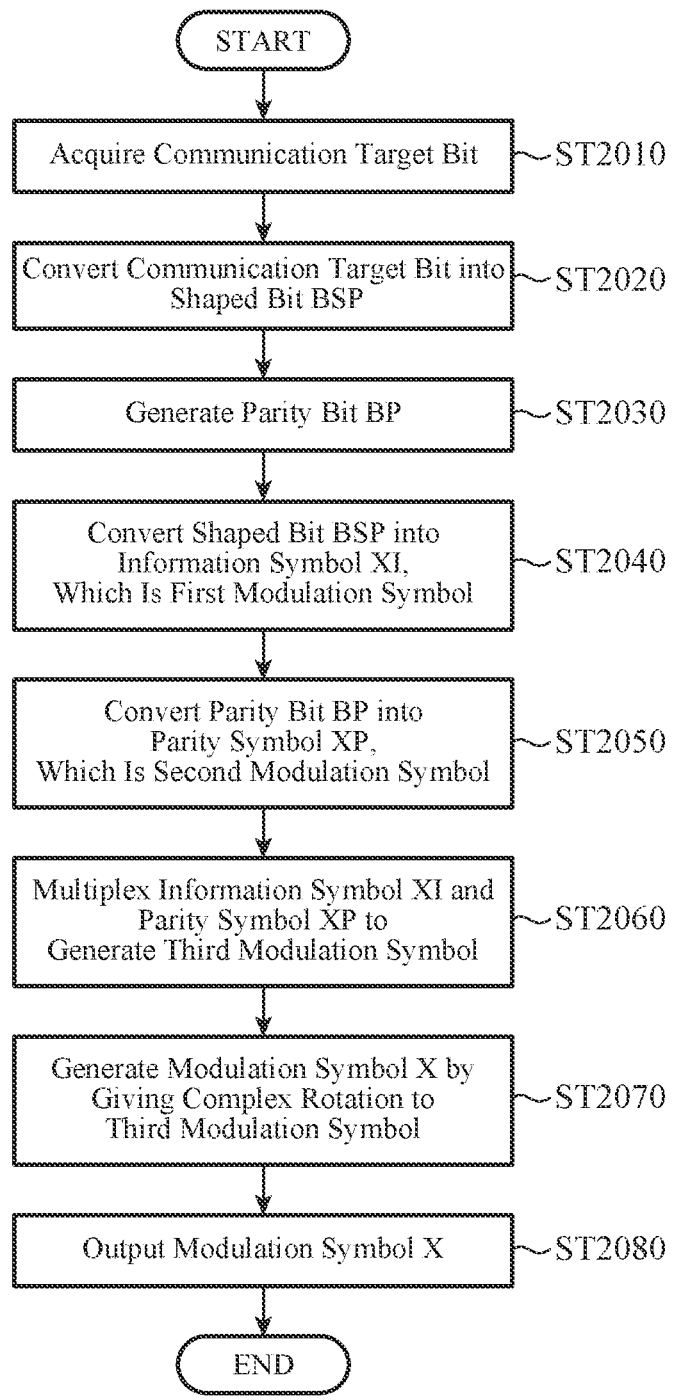
FIG. 20 is a flowchart illustrating one example of processing of the transmission code processing device according to the third embodiment.

FIG. 20 is a flowchart illustrating one example of processing of the transmission code processing device 100b according to the third embodiment.

The transmission code processing device 100b repeatedly executes the processing of the flowchart in FIG. 20.

First, in Step ST2010, the signal point arrangement shaping encoding unit 110 acquires a communication target bit.

Next, in Step ST2020, the signal point arrangement shaping encoding unit 110 converts the communication target bit into the shaped bit BSP.

Next, in Step ST2030, the systematic error correction encoding unit 120 generates the parity bit BP based on the shaped bit BSP.

Next, in Step ST2040, the first symbol mapping unit 130 converts the shaped bit BSP into the information symbol XI, which is the first modulation symbol.

Next, in Step ST2050, the second symbol mapping unit 140 converts the parity bit BP into the parity symbol XP, which is the second modulation symbol.

Next, in Step ST2060, the symbol multiplexing unit 150 generates the third modulation symbol by multiplexing the information symbol XI and the parity symbol XP.

Next, in Step ST2070, the complex rotation unit 160 generates the modulation symbol X by giving complex rotation to the third modulation symbol.

Next, in Step ST2080, the complex rotation unit 160 outputs the generated modulation symbol X.

After Step ST2080, the transmission code processing device 100b ends the processing of the flowchart in FIG. 20, and the transmission code processing device 100b returns to the processing of Step ST2010 and repeatedly executes the processing of the flowchart in FIG. 20.

Note that the processing of Step ST2040 may be executed between the completion of the processing of Step ST2020 and the execution of the processing of Step ST2060.

Furthermore, when the processing of Step ST2040 and the processing of Step ST2050 are executed after the completion of the processing of Step ST2030, the processing of Step ST2040 and the processing of Step ST2050 may be executed in any order, or may be executed in parallel by parallel processing.

As described above, the transmission code processing device 100b according to the third embodiment includes: a signal point arrangement shaping encoding unit 110 to perform signal point arrangement shaping encoding on a communication target bit input from an outside, and convert the communication target bit into a shaped bit BSP of mi column; a systematic error correction encoding unit 120 to perform systematic error correction encoding, by using, as an information bit, the shaped bit BSP obtained by conversion performed by the signal point arrangement shaping encoding unit 110, and generate a parity bit BP of mp column based on the shaped bit BSP; a first symbol mapping unit 130 to convert the shaped bit BSP obtained by conversion performed by the signal point arrangement shaping encoding unit 110, into a first modulation symbol; a second symbol mapping unit 140 to convert the parity bit BP generated by the systematic error correction encoding unit 120 into a second modulation symbol; a symbol multiplexing unit 150 to generate a third modulation symbol by multiplexing the first modulation symbol obtained by conversion performed by the first symbol mapping unit 130 and the second modulation symbol obtained by conversion performed by the second symbol mapping unit 140; and a complex rotation unit 160 to give any complex rotation to the third modulation symbol generated by the symbol multiplexing unit 150 in such a way as to reduce a peak to average power ratio for each dimension, in which the first modulation symbol has one signal point element in a first signal point set sci including ci signal point including an origin, the second modulation symbol has one signal point element in a second signal point set scp including cp signal point not including the origin, and the signal point arrangement shaping encoding unit 110 performs signal point arrangement shaping in which the first modulation symbol has one signal point element included in the first signal point set sci.

With such configuration, when transmitting a communication target bit string at a low information rate, the transmission code processing device 100b can reduce the PAPR per dimension of a signal for transmission based on the PAM symbol as compared with that before the complex rotation, while generating a transmission signal with high theoretical performance without using a high QAM. As a result, when transmitting a communication target bit string at a low information rate, the transmission code processing device 100b can reduce the performance degradation on a circuit mounting or performance degradation on hardware mounting, while generating a transmission signal with high theoretical performance without using a high QAM.

Note that, within the scope of the present invention, the present disclosure can have freely combined embodiments, variations of any component in each embodiment, or omissions of any component in each embodiment.

INDUSTRIAL APPLICABILITY

The present disclosure is suitable for an optical communication system in which, when information is transmitted from an optical transmitter to a device on a reception side, the optical transmitter performs error correction encoding on the information to be transmitted, and the device on the reception side performs error correction on the received information.

REFERENCE SIGNS LIST 1, 1a, 1b: optical transmitter, 10: transmission waveform shaper, 11: D/A converter, 12: Transmission light source, 13: optical modulator, 100, 100a, 100b: transmission code processing device, 110: signal point arrangement shaping encoding unit, 120, 120a: systematic error correction encoding unit, 121: bit label conversion unit, 122: hard decision error correction encoding unit, 123: soft decision error correction encoding unit, 124: parity bit multiplexing unit, 130, 130a: first symbol mapping unit, 140, 140a: second symbol mapping unit, 150: symbol multiplexing unit, 160: complex rotation unit, 801: processor, 802: memory, 803: processing circuit

The invention claimed is:

1. A transmission code processing device comprising:
   signal point arrangement shaping encoding circuitry to perform signal point arrangement shaping encoding on a communication target bit input from an outside, and convert the communication target bit into a shaped bit of mi (mi is an integer equal to or more than one) column;
   systematic error correction encoding circuitry to perform systematic error correction encoding by using, as an information bit, the shaped bit obtained by conversion performed by the signal point arrangement shaping encoding circuitry, and generate a parity bit of mp (mp is an integer equal to or more than one) column based on the shaped bit;
   first symbol mapping circuitry to convert the shaped bit obtained by conversion performed by the signal point arrangement shaping encoding circuitry into a first modulation symbol;
   second symbol mapping circuitry to convert the parity bit generated by the systematic error correction encoding circuitry into a second modulation symbol; and
   symbol multiplexing circuitry to generate a third modulation symbol by multiplexing the first modulation symbol obtained by conversion performed by the first symbol mapping circuitry and the second modulation symbol obtained by conversion performed by the second symbol mapping circuitry,
   wherein the first modulation symbol has one signal point element in a first signal point set including ci (ci is an integer equal to or more than one) signal point including an origin,
   the second modulation symbol has one signal point element in a second signal point set including cp (cp is an integer equal to or more than one) signal point not including the origin, and
   the signal point arrangement shaping encoding circuitry performs signal point arrangement shaping in which the first modulation symbol has one signal point element included in the first signal point set.

2. The transmission code processing device according to claim 1,
   wherein mp is equal to or less than mi.

3. The transmission code processing device according to claim 1,
   wherein cp is equal to or less than ci.

4. The transmission code processing device according to claim 1, further comprising
   complex rotation circuitry to give any complex rotation to the third modulation symbol generated by the symbol multiplexing circuitry in such a way as to reduce a peak to average power ratio for each dimension.

5. The transmission code processing device according to claim 1,
   wherein a coordinate of the signal point element included in the first signal point set is expressed by a combination of Di (Di is an integer equal to or more than two) one-dimensional coordinates corresponding to the number of dimensions of a first information symbol, and
   the systematic error correction encoding circuitry includes:
   bit label conversion circuitry to generate a one-dimensional shaped bit of mil (mil is an integer equal to or more than one and equal to or less than mi) column, by associating the signal point element projected to one of the Di one-dimensional coordinates with a bit of the mil column, performing bit allocation based on Gray encoding on a higher bit excluding a least significant bit in the mil column, and performing bit allocation for set division on the least significant bit in the mil column;
   hard decision error correction encoding circuitry to perform systematic hard decision error correction encoding by using, as information bits, all bits from most significant to least significant of the one-dimensional shaped bit of the mil column generated by the bit label conversion circuitry, and generate a hard decision error correction parity bit;
   soft decision error correction encoding circuitry to perform systematic soft decision error correction encoding by using, as information bits, the least significant bit of the one-dimensional shaped bit of the mil column generated by the bit label conversion circuitry and the hard decision error correction parity bit generated by the hard decision error correction encoding circuitry, and generate a soft decision error correction parity bit; and
   parity bit multiplexing circuitry to generate the parity bit by multiplexing the hard decision error correction parity bit generated by the hard decision error correction encoding circuitry and the soft decision error correction parity bit generated by the soft decision error correction encoding circuitry.

6. The transmission code processing device according to claim 1,
   wherein the first symbol mapping circuitry performs symbol mapping using a rule satisfying a correspondence relation of bit to symbol, by performing bit allocation based on Gray encoding on a higher bit excluding a least significant bit in mil (mil is an integer equal to or more than one and equal to or less than mi) column, and by performing bit allocation for set division on the least significant bit in the mil column, and converts the shaped bit into the first modulation symbol, and
   the second symbol mapping circuitry performs symbol mapping using Gray encoding, and converts the parity bit into the second modulation symbol.

7. An optical transmitter comprising:
   the transmission code processing device according to claim 1;
   a transmission waveform shaper to convert the third modulation symbol generated by the transmission code processing device into a digital baseband signal;

a D/A converter to convert the digital baseband signal obtained by conversion performed by the transmission waveform shaper into an analog electrical signal;

a transmission light source to emit unmodulated light; and an optical modulator to modulate the unmodulated light emitted from the transmission light source with the analog electrical signal obtained by conversion performed by the D/A converter.

8. A transmission code processing method comprising:

performing signal point arrangement shaping encoding on a communication target bit input from an outside, and converting the communication target bit into a shaped bit of mi (mi is an integer equal to or more than one) column;

performing systematic error correction encoding by using, as an information bit, the shaped bit, and generating a parity bit of mp (mp is an integer equal to or more than one) column based on the shaped bit;

converting the shaped bit into a first modulation symbol;

converting the parity bit into a second modulation symbol; and generating a third modulation symbol by multiplexing the first modulation symbol and the second modulation symbol, wherein the first modulation symbol has one signal point element in a first signal point set including ci (ci is an integer equal to or more than one) signal point including an origin, the second modulation symbol has one signal point element in a second signal point set including cp (cp is an integer equal to or more than one) signal point not including the origin, and signal point arrangement shaping in which the first modulation symbol has one signal point element included in the first signal point set is performed.

* * * * *